US012761495B2

(12) United States Patent
Ozcan et al.

(10) Patent No.: US 12,761,495 B2
(45) Date of Patent: Oct. 13, 2026

(54) ALL-OPTICAL IMPLEMENTATION OF MULTIPLE OPTICAL TRANSFORMATIONS THROUGH A POLARIZATION-ENCODED DIFFRACTIVE NETWORK

(71) Applicant: THE REGENTS OF THE UNIVERSITY OF CALIFORNIA, Oakland, CA (US)

(72) Inventors: Aydogan Ozcan, Los Angeles, CA (US); Jingxi Li, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 192 days.

(21) Appl. No.: 18/849,476

(22) PCT Filed: Mar. 22, 2023

(86) PCT No.: PCT/US2023/064837
§ 371 (c)(1),
(2) Date: Sep. 21, 2024

(87) PCT Pub. No.: WO2023/183859
PCT Pub. Date: Sep. 28, 2023

(65) Prior Publication Data

US 2025/0189811 A1 Jun. 12, 2025

Related U.S. Application Data

(60) Provisional application No. 63/323,446, filed on Mar. 24, 2022.

(51) Int. Cl.
*G02B 27/28* (2006.01)
*G06E 1/00* (2006.01)

(52) U.S. Cl.
CPC .............. *G02B 27/286* (2013.01); *G06E 1/00* (2013.01)

(58) Field of Classification Search
CPC .................................................... G02B 27/286
See application file for complete search history.

(56) References Cited

U.S. PATENT DOCUMENTS 11,392,830 B2 7/2022 Ozcan et al.
11,694,082 B2 7/2023 Ozcan et al.
(Continued)

FOREIGN PATENT DOCUMENTS

WO WO 2019/200289 A1 10/2019
WO WO 2020/247828 A1 12/2020
(Continued)

OTHER PUBLICATIONS

PCT International Preliminary Report on Patentability (Chapter I of the Patent Cooperation Treaty) for PCT/US2023/064837, Applicant: The Regents of the University of California, Form PCT/IB/326 and 373, dated Oct. 3, 2024 (6 pages).
(Continued)

*Primary Examiner* — James A Dudek
(74) *Attorney, Agent, or Firm* — VISTA IP LAW GROUP LLP

(57) ABSTRACT

A polarization multiplexed diffractive processor is disclosed that all-optically performs multiple, arbitrarily-selected transformations (e.g., linear) through a single diffractive network trained using deep learning. In this framework, an array of pre-selected linear polarizers is positioned between trainable transmissive diffractive materials that are isotropic, and different target linear transformations (complex-valued) are uniquely assigned to different combinations of input/output polarization states. The transmission layers of this polarization multiplexed diffractive network are trained and
(Continued)

optimized via deep learning and error-backpropagation by using thousands of examples of the input/output fields corresponding to each one of the complex-valued linear transformations assigned to different input/output polarization combinations. This polarization-multiplexed all-optical diffractive processor can find various applications in optical computing and polarization-based machine vision tasks.

29 Claims, 26 Drawing Sheets

(56) References Cited

U.S. PATENT DOCUMENTS

| | | | |
|---|---|---|---|
| 12,086,717 | B2 | 9/2024 | Ozcan et al. |
| 2021/0002715 | A1 | 1/2021 | Zalevsky et al. |
| 2021/0009737 | A1 | 1/2021 | Jaeghers et al. |
| 2022/0253685 | A1 | 8/2022 | Ozcan et al. |
| 2022/0327371 | A1 | 10/2022 | Ozcan et al. |
| 2023/0024787 | A1 | 1/2023 | Ozcan et al. |
| 2023/0153600 | A1 | 5/2023 | Ozcan et al. |
| 2023/0162016 | A1 | 5/2023 | Ozcan et al. |
| 2023/0251189 | A1 | 8/2023 | Ozcan et al. |
| 2023/0401436 | A1 | 12/2023 | Ozcan et al. |

FOREIGN PATENT DOCUMENTS

| | | | |
|---|---|---|---|
| WO | WO 2021/050550 | A1 | 3/2021 |
| WO | WO 2021/231139 | A1 | 11/2021 |
| WO | WO 2021/237170 | A1 | 11/2021 |
| WO | WO 2022/006018 | A1 | 1/2022 |
| WO | WO 2022/056422 | A1 | 3/2022 |
| WO | WO 2022/087345 | A1 | 4/2022 |
| WO | WO 2023/287586 | A1 | 1/2023 |
| WO | WO 2023/141403 | A1 | 7/2023 |
| WO | WO 2023/183859 | A1 | 9/2023 |
| WO | WO 2023/230412 | A1 | 11/2023 |
| WO | WO 2024/123506 | A1 | 6/2024 |
| WO | WO 2024/155325 | A9 | 7/2024 |

OTHER PUBLICATIONS

Bijie Bai et al., Pathological crystal imaging with single-shot computational polarized light microscopy, J Biophotonics., Jan. 2020; 13(1): e201960036; doi:10.1002/jbio.201960036.
Zhi-Yu Chen, et al., Use of polarization freedom beyond polarizationdivision multiplexing to support high-speed and spectral-efficient data transmission, Light: Science & Applications (2017) 6, e16207; doi:10.1038/lsa.2016.207.
Shi Dongfeng et al., Polarization-multiplexing ghost imaging, Opt Lasers Eng (2018).
Stephen G. Evangelides Jr. et al., Polarization Multiplexing with Solitons, Journal of Lightwave Technology, vol. 10, No. 1, Jan. 1992.
Yan Han et al., Coherent optical communication using polarization multiple-input-multiple-output, Optics Express, Sep. 19, 2005,vol. 13, No. 19, pp. 7527-7534.
Diederik P. Kingma et al., Adam: A Method for Stochastic Optimization, Published as a conference paper at ICLR 2015, arXiv:1412.6980v9 [cs.LG] Jan. 30, 2017.
Onur Kulce et al., All-optical synthesis of an arbitrary linear transformation using diffractive surfaces, Light: Science & Applications (2021) 10:196.
Onur Kulce et al., All-optical information-processing capacity of diffractive surfaces, Light: Science & Applications (2021) 10:25.
Jingxi Li et al., Class-specific Differential Detection in Diffractive Optical Neural Networks Improves Inference Accuracy, Adv. Photonics (2019).
Jingxi Li et al., Spectrally encoded single-pixel machine vision using diffractive networks, Sci. Adv. (2021); 7:eabd7690.
Yi Luo et al., Design of task-specific optical systems using broadband diffractive neural networks, Light: Science & Applications (2019) 8:112.
Tairan Liu et al., Deep Learning-Based Holographic Polarization Microscopy, ACS Photonics, (Nov. 18, 2020); 7 (11): 3023-3034. doi:10.1021/acsphotonics.0c01051.
Deniz Mengu et al., Diffractive all-optical computing for quantitative phase imaging, ArXiv220108964, Phys. (2022).
Md Sadman Sakib Rahman et al., Ensemble learning of diffractive optical networks, Light: Science & Applications (2021) 10:14.
Deniz Mengu et al., Scale-, Shift-, and Rotation-Invariant Diffractive Optical Networks, ACS Photonics (2021), 8, 324-334.
Deniz Mengu et al., Analysis of Diffractive Optical Neural Networks and Their Integration With Electronic Neural Networks, IEEE Journal of Selected Topics in Quantum Electronics, vol. 26, No. 1, (Jan./Feb. 2020), 3700114.
Deniz Mengu et al., Misalignment resilient diffractive optical networks, Nanophotonics (2020); 9 (13): 4207-4219.
Deniz Mengu et al., Classification and reconstruction of spatially overlapping phase images using diffractive optical networks, Scientific Reports (2022) 12:8446, https://doi.org/10.1038/s41598-022-12020-y.
Tiankuang Zhou et al., In situ optical backpropagation training of diffractive optical neural networks, Photonics Research, vol. 8., No. 6, 940-953 (Jun. 2020).
PCT International Search Report and Written Opinion for PCT/US2023/064837, Applicant: The Regents of the University of California, dated Oct. 20, 2023 (7 pages).

Pol. ① (LHCP-X, A1) Pol. ② (RHCP-Y, A2) Pol. ③ (LHCP-Y, A3) Pol. ④ (RHCP-X, A4)

ALL-OPTICAL IMPLEMENTATION OF MULTIPLE OPTICAL TRANSFORMATIONS THROUGH A POLARIZATION-ENCODED DIFFRACTIVE NETWORK

RELATED APPLICATION

This Application is a U.S. National Stage filing under 35 U.S.C. § 371 of International Application No. PCT/US2023/064837, filed on Mar. 22, 2023, which claims priority to U.S. Provisional Patent Application No. 63/323,446, filed on Mar. 24, 2022, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Number FA9550-21-1-0324, awarded by the U.S. Air Force, Office of Scientific Research. The government has certain rights in the invention.

TECHNICAL FIELD

The technical field generally relates to diffractive optical networks used to perform multiple complex-valued, arbitrary optical transformations using polarization multiplexing. The polarization-multiplexed all-optical diffractive processor can find various applications in optical computing and polarization-based machine vision tasks.

BACKGROUND

With the increasing global demand for machine learning and computing in general, using light to perform computation has been a rapidly growing focus area of optics and photonics. The research on optical computing has a long history spanning decades of exciting research and development efforts. Motivated by the massive success of artificial intelligence and deep learning, in specific, a myriad of new hardware designs for optical computing have been reported recently, including, e.g., on-chip integrated photonic circuits, free-space optical platforms, and others. Among these different optical computing systems, the integration of successive transmissive diffractive layers (forming an optical network) has been demonstrated for optical information processing, such as object classification, image reconstruction, all-optical phase recovery and quantitative phase imaging, and logic operations. A diffractive network is first trained using deep learning and error-backpropagation methods implemented in a digital computer, after which the resulting transmissive layers are fabricated to form a physical network that computes based on the diffraction of the input light through these spatially-engineered transmissive layers. Because the computational task is completed as the light passes through thin and passive optical elements, this approach is very fast, and the inference process does not consume power except for the illumination light. It is also scalable since an increase in the input field-of-view (FOV) can be handled by fabricating larger transmissive layers and/or deeper diffractive designs with more successive layers positioned one after another. Furthermore, both the phase and the amplitude information channels of the input scene/FOV can be processed by a diffractive optical network, without the need for phase retrieval or digitizing, vectorizing an image of the scene, which makes diffractive computing highly desirable for machine vision applications. Harnessing light-matter interactions using engineered diffractive surfaces also enabled the inverse design of optical elements for e.g., spatially-controlled wavelength demultiplexing, pulse engineering, and orbital angular momentum multiplexing/demultiplexing. It has also been shown that a diffractive network can be trained by optimizing its diffractive layers to perform an arbitrary complex-valued linear transformation between its input and output fields-of-view, demonstrating its computing capability for complex-valued matrix-vector operations at the speed of light propagation through a passive diffractive system.

All these results highlight the unique capabilities of diffractive networks to manipulate various physical properties of light, including e.g., its amplitude and phase distribution, spatial frequency, spectral bandwidth, orbital angular momentum, for performing specific computational tasks that are desired. As another important physical property of light, polarization specifies the geometrical orientation of electromagnetic wave oscillations. Utilizing the polarization state of light has played a pivotal role in numerous applications, including telecommunications, imaging, sensing, computing, and displays. For example, polarization-division multiplexing (PDM) has been used in telecommunication systems to permit two channels of information to be simultaneously transmitted using orthogonal polarization states over a single wavelength.

SUMMARY

In one embodiment, polarization-multiplexed diffractive optical networks are disclosed that perform a group of arbitrary linear transformations using a common set of diffractive layers that are jointly-optimized to all-optically perform each one of the target complex-valued linear transformations at a different combination of input/output polarization states. In an earlier work by Kulce et al., it was shown that a diffractive optical network composed of spatially-engineered layers could all-optically perform an arbitrary complex-valued linear transformation between an input and output field-of-view with a negligible error when the number of trainable diffractive elements/neurons (N) approaches $N_iN_o$, where $N_i$ and $N_o$ represent the number of pixels at the input and output FOVs, respectively. See Kulce O, Mengu D, Rivenson Y, Ozcan A., All-optical synthesis of an arbitrary linear transformation using diffractive surfaces, Light Sci Appl 2021; 10:196. Here, polarization multiplexing was used between the input and output FOVs of a diffractive network to increase the capacity of diffractive computing and all-optically perform a group of arbitrary linear transformations that are complex-valued. The polarization multiplexed diffractive network designs are not based on birefringent, anisotropic or polarization-sensitive materials; instead, the designs utilize standard diffractive surfaces where the phase and amplitude transmission properties (e.g., coefficient) (or reflection properties/coefficients in a reflection configuration) of each trainable diffractive feature are independent of the polarization state of the input light. Using a network design solely based on standard isotropic diffractive materials makes the designs simpler in terms of material selection, fabrication and scale-up; however, it also makes the diffractive network insensitive to different polarization states, and therefore, polarization multiplexed all-optical computation of different transformations becomes impossible.

To overcome this challenge, a non-trainable, pre-determined array of linear polarizers (at 0°, 45°, 90° and 135°) was used that was located within the diffractive network that acted as polarization seeds for the trainable isotropic diffractive layers to all-optically execute different linear transformations through input/output polarization multiplexing (see FIG. 1A). Stated differently, data-driven training and optimization of isotropic diffractive layers was used to encode different linear transformations into different input/output polarization combinations, and this encoding is made possible by the polarization mode diversity introduced by a non-trainable, pre-determined array of linear polarizers within the diffractive volume.

In a first implementation, two different, arbitrarily-selected linear transformations (i.e., $N_p=2$) were performed using a diffractive network composed of four transmissive layers that are jointly optimized using deep learning, where the first target linear transformation was assigned to x (0°) linear input and x linear output polarization combination, and the second target linear transformation was assigned to y (90°) linear input and y linear output polarization combination. For this case of $N_p=2$, there are two different schemes (FIG. 1B) to all-optically access/implement the desired linear transformations: sequential (x and y input polarization states encode the input information sequentially, one after another) or simultaneous (x and y input polarizations encode the input information at the same time within the input FOV). The numerical results (FIGS. 2A-2E-5A-5D) reveal that one can successfully train a diffractive network under each one of these operation modes (sequential vs. simultaneous) to approximate the two target, arbitrary-selected linear transformations with a negligible error when the number of trainable diffractive neurons N approaches $N_pN_iN_o=2N_iN_o$.

In a second implementation (FIG. 6), four different, arbitrary linear transformations (i.e., $N_p=4$) were performed using a diffractive network composed of eight transmissive layers that are jointly optimized using deep learning and examples of input/output fields corresponding to the selected complex-valued linear transformations (ground truth). In this case, the first target transformation was assigned to x linear input and 45° linear output polarization combination, the second target transformation was assigned to y linear input and 135° linear output polarization combination, the third target transformation was assigned to x linear input and 135° linear output polarization combination and finally the fourth target transformation was assigned to y linear input and 45° linear output polarization combination. The analyses of this 4-channel polarization multiplexed diffractive system show that when $N \geq N_pN_i\ N_o=4N_iN_o$, all the target linear transformations can be successfully approximated, following a similar conclusion as in the first implementation case ($N_p=2$).

Without the use of a non-trainable, pre-determined array of linear polarizers acting as polarization seeds within the network, none of these multiplexing results could be achieved using isotropic diffractive materials, no matter how they are trained or optimized, since they would normally perform the same transformation under different input polarization states.

It should be appreciated that these results should not be confused with polarization multiplexed (or wavelength/illumination multiplexed) projection of a set of desired complex fields at the output of a metamaterial design; such multiplexed metamaterial systems do not implement an arbitrary matrix multiplication operation. Each input-output polarization combination in this diffractive design represents an all-optical implementation of a unique linear transformation between the input and output FOVs. Therefore, for each input-output polarization combination, infinitely many different target complex fields can be all-optically synthesized by the trained diffractive network in response to different input field distributions; and this capability accurately defines the corresponding complex-valued linear transformation at the output FOV for all the possible and infinitely many combinations of phase and amplitude distributions at the input FOV.

A polarization multiplexed diffractive network can perform an arbitrary set of target linear transformations using the same diffractive layers that all-optically implement a distinct complex-valued linear transformation at a selected input/output polarization combination. It is believed that this unique framework will be valuable in developing high-throughput optical processors and polarization-based machine vision systems operating at different parts of the electromagnetic spectrum. Moreover, the presented diffractive computing platform and the underlying concepts can be used to develop polarization-aware optical information processing systems for e.g., detection, localization, and statistical inference of objects with unique polarization properties.

In one embodiment, a polarization-encoded diffractive network includes one or more optically transmissive and/or reflective substrate layer(s) arranged in an optical path having one or more polarizer arrays interposed between the one or more optically transmissive and/or reflective substrate layer(s) along the optical path, each of the optically transmissive and/or reflective substrate layer(s) having a plurality of physical features formed on or within the one or more optically transmissive or reflective substrate layer(s) and having different transmission and/or reflection properties as a function of the lateral coordinates across each substrate layer, wherein the one or more optically transmissive and/or reflective substrate layer(s) and the one or more polarizer arrays collectively define or approximate a plurality of distinct optical transformations between a vectorized input optical field input to the polarization-encoded diffractive network and a vectorized output optical field output from the polarization-encoded diffractive network, and wherein the one or more optically transmissive and/or reflective substrate layer(s) are designed during a training phase with the one or more polarizer arrays to define or optimize the plurality of physical features formed on or within the one or more optically transmissive or reflective substrate layer(s) to perform or approximate the plurality of distinct optical transformations between the input and the output.

In another embodiment, a method of performing or approximating a plurality of transformations of a vectorized input optical field using a polarization-encoded diffractive network includes: (1) providing a polarization-encoded diffractive network having one or more optically transmissive and/or reflective substrate layer(s) arranged in an optical path having one or more polarizer arrays interposed between the one or more optically transmissive and/or reflective substrate layer(s) along the optical path, each of the optically transmissive and/or reflective substrate layer(s) having a plurality of physical features formed on or within the one or more optically transmissive or reflective substrate layer(s) and having different transmission and/or reflection properties as a function of the lateral coordinates across each substrate layer, wherein the one or more optically transmissive and/or reflective substrate layer(s) and the one or more polarizer arrays collectively define or approximate a plurality of distinct optical transformations between the vectorized input optical field input to the polarization-encoded diffractive network and a vectorized output optical field output from the polarization-encoded diffractive network, wherein the one or more optically transmissive and/or reflective substrate layer(s) are designed during a training phase with the one or more polarizer arrays to define the plurality of physical features formed on or within the one or more optically transmissive or reflective substrate layer(s) to perform or approximate the plurality of distinct optical transformations: (2) inputting the vectorized input optical field to the polarization-encoded diffractive network; and (3) capturing the vectorized output optical field from the polarization-encoded diffractive network with one or more image sensors or detector arrays.

BRIEF DESCRIPTION OF THE DRAWINGS

FIG. 1B illustrates a schematic for the sequential polarization access (SeqPA, left—Operating Mode 1) mode and the simultaneous polarization access (SimPA, right—Operating Mode 2) mode that can be used to operate the 2-channel polarization multiplexed diffractive network.

FIG. 2A shows amplitude and phase of the arbitrarily generated matrices $A_1$ and $A_2$, which serve as the ground truth (target) for the diffractive all-optical transformations. FIG. 2B illustrates curves representing the normalized mean-squared error between the ground truth transformation matrices ($A_1$ and $A_2$) and the all-optical transforms ($A'_1$ and $A'_2$) resulting from the trained diffractive networks as a function of the number of diffractive neurons N. The solid curves are achieved by the polarization multiplexed diffractive networks trained using the SeqPA mode, which are compared with the dashed curves achieved by the regular diffractive networks trained with the same set of N but without any polarization multiplexing. For the polarization multiplexed models, the results for the two polarization channels ① and ②, corresponding to transforms $A'_1$ and $A'_2$, are shown in separate curves that are labeled with "SeqPA ①" and "SeqPA ②", respectively. For the regular diffractive models without polarization multiplexing, the results for all-optical approximation of $A_1$ and $A_2$ are shown in separate curves labeled with "No pol. $A_1$" and "No pol. $A_2$", respectively. The space between the simulation data points is linearly interpolated. FIG. 2C: same as FIG. 2B but the cosine similarity between the all-optical transforms and their ground truth shown in FIG. 2A is reported. FIG. 2D: same as FIG. 2B but the mean-squared error between the diffractive network output fields and their ground truth is reported. FIG. 2E: diffraction efficiency of the presented diffractive networks.

FIG. 5A: curves representing the normalized mean-squared error between the ground truth transformation matrices ($A_1$ and $A_2$) and the all-optical transforms ($A'_1$ and $A'_2$) resulting from the trained diffractive networks as a function of the number of diffractive neurons N. The solid curves are achieved by the polarization multiplexed diffractive systems trained using the SimPA mode, which are compared with the dashed curves achieved by the regular diffractive networks trained with the same set of N but without any polarization multiplexing. For the polarization multiplexed models, the results for the two polarization channels ① and ②, corresponding to transforms $A'_1$ and $A'_2$, are shown in separate curves that are labeled with "SimPA ①" and "SimPA ②", respectively. For the regular models without polarization multiplexing, the results for all-optical approximation of $A_1$ and $A_2$ are shown in separate curves labeled with "No pol. $A_1$" and "No pol. $A_2$", respectively. The space between the simulation data points is linearly interpolated. FIG. 5B: same as FIG. 5A but the cosine similarity between the all-optical transforms and their ground truth is reported. FIG. 5C: same as FIG. 5A but the mean-squared error between the diffractive network output fields and their ground truth is reported. FIG. 5D: diffraction efficiency of the presented diffractive networks.

FIG. 6A is an optical layout of the polarization-encoded diffractive network, where eight trained diffractive layers and two arrays of linear polarizers are jointly used to perform four distinct, complex-valued linear transformations between the input field i and the output field o by using polarization encoding/decoding at the input/output FOVs. FIG. 6B is a schematic for the operation of the 4-channel polarization multiplexed all-optical computing framework, where the four polarization channels, ①, ②, ③ and ④, are formed by sequentially connecting one of the two input polarization states with one of the two output polarization states.

FIG. 7A: amplitude and phase of the arbitrarily generated matrices $A_1$, $A_2$, $A_3$ and $A_4$, which serve as the ground truth (target) for the diffractive all-optical transformations. FIG. 7B: curves representing the normalized mean-squared error between the ground truth transformation matrices ($A_1$, $A_2$, $A_3$ and $A_4$) and the all-optical transforms ($A'_1$, $A'_2$, $A'_3$ an $A'_4$, examples shown in FIG. 11) resulting from the trained diffractive networks as a function of the number of diffractive neurons N. The solid curves are achieved by the 4-channel polarization multiplexed diffractive systems, which are compared with the dashed curves achieved by the regular diffractive networks trained with the same set of N but without polarization multiplexing. For the polarization multiplexed models, the results for the four polarization channels ①, ②), ③) and ④ are shown in separate curves but jointly labeled with "Pol. ①)/②/③/④" due to the spatial overlap of these curves. For the regular diffractive models without polarization multiplexing, the results for all-optical approximation of ($A_1$, $A_2$, $A_3$ and $A_4$) (individually) are shown in separate curves but jointly labeled with "No pol. $A_1/A_2/A_3/A_4$" due to the spatial overlap of these curves. The space between the simulation data points is linearly interpolated. FIG. 7C: same as FIG. 7B but cosine similarity between the all-optical transforms and their ground truth is reported. FIG. 7D: same as FIG. 7B but the mean-squared error between the diffractive network output fields and their ground truth is reported. FIG. 7E: diffraction efficiency of the presented diffractive networks.

FIG. 9A: curves representing the normalized mean-squared errors between the ground truth transformation matrices ($A_1$ and $A_2$, shown in FIGS. 2A and 3) and their all-optical transforms ($A'_1$, and $A'_2$) resulting from the trained diffractive networks as a function of N. The dash-dotted curves (labeled with "Trained with SeqPA but tested with SimPA ①/②") are achieved by the 2-channel polarization multiplexed diffractive network trained under the SeqPA mode but then immediately tested under the SimPA mode, which are compared with the solid curves achieved by the same diffractive networks both trained and tested under the SeqPA mode (labeled with "SeqPA ①/②"), and the long dashed curves achieved by different diffractive networks both trained and tested under the SimPA mode (labeled with "SimPA ①/②"). Note that the results for the two polarization channels ① and ②, corresponding to transforms $A'_1$ and $A'_2$, are shown in separate curves but jointly labeled with " . . . ①/②", respectively, due to the spatial overlap of these curves. The space between the simulation data points is linearly interpolated. FIG. 9B: same as (FIG. 9A), but the cosine similarity between the all-optical transforms and their ground truth is reported. FIG. 9C: same as (FIG. 9B), but the mean-squared error between the diffractive network-estimated output fields and their ground truth is reported. FIG. 9D: diffraction efficiency of the presented diffractive networks

FIG. 13A: curves representing the normalized mean-squared error between the ground truth transformation matrices ($A_1$, $A_2$, $A_3$ and $A_4$) and the all-optical transforms ($A'_1$, $A'_2$, $A'_3$ and $A'_4$) resulting from the trained diffractive networks as a function of N. The solid curves are achieved by the 4-channel polarization multiplexed, phase-only diffractive networks, which are compared with the dashed curves achieved by the 4-channel polarization multiplexed, complex-valued diffractive networks, and the dash-dotted curves achieved by the regular diffractive networks (without polarization multiplexing). For the polarization multiplexed phase-only diffractive models, the results for the four polarization channels ①, ②), ③) and ④ are shown in separate curves but jointly labeled with "Phase-only pol. ①/②/③/④" due to the spatial overlap of these curves. For the polarization multiplexed complex-valued diffractive models, the results for the four polarization channels ①, ②), ③) and ④ are shown in separate curves but jointly labeled with "Complex-valued pol. ①/②/③/④" due to the spatial overlap of these curves. For the regular diffractive models without polarization multiplexing, the results for all-optical approximation of $A_1$, $A_2$, $A_3$ and $A_4$ (individually) are shown in separate curves but jointly labeled with "No pol. $A_1$, $A_2$, $A_3$ and $A_4$" due to the spatial overlap of these curves. The space between the simulation data points is linearly interpolated. FIG. 13B: same as FIG. 13A but cosine similarity between the all-optical transforms and their ground truth is reported. FIG. 13C: same as FIG. 13A but the mean-squared error between the diffractive network output fields and their ground truth is reported. FIG. 13D: diffraction efficiency of the presented diffractive networks.

FIG. 14A: arbitrarily-selected real-valued matrices $R_1$, $R_2$, $R_3$ and $R_4$, which serve as the ground truth (target) for the diffractive all-optical transformations. FIG. 14B: curves representing the normalized mean-squared error between the ground truth transformation matrices ($R_1$, $R_2$, $R_3$ and $R_4$) and the all-optical transforms ($R'_1$, $R'_2$, $R'_3$ and $R'_4$) resulting from the trained phase-only diffractive networks as a function of N. The space between the simulation data points is linearly interpolated. FIG. 14C: same as FIG. 14B but cosine similarity between the all-optical transforms and their ground truth is reported. FIG. 14D: same as FIG. 14B but the mean-squared error between the diffractive network output fields and their ground truth is reported. FIG. 14E: diffraction efficiency of the presented diffractive networks.

FIG. 22A: curves representing the normalized mean-squared error between the ground truth transformation matrices ($A_1$, $A_2$, $A_3$ and $A_4$, shown in FIG. 7A) and the all-optical transforms $$(A'_1, A'_2, A'_3 \text{ and } A'_4)$$

resulting from the trained diffractive networks as a function of N. The space between the simulation data points is linearly interpolated. FIG. 22B: same as (A) but the cosine similarity between the all-optical transforms and their ground truth is reported. FIG. 22C: same as (B) but the mean-squared error between the diffractive network output fields and their ground truth is reported. FIG. 22D: diffraction efficiency of the presented diffractive networks.

FIG. 23A illustrates the transformation error as a function of period of each linear polarizer unit on the polarizer arrays. FIG. 23B illustrates the transformation error as a function of overall size of each polarizer array. FIG. 23C illustrates the transformation error as a function of number and position of the polarizer arrays in the diffractive network. Note that for FIGS. 23A-23C each histogram has data presented for the different polarizer arrays (①, ②, ③ and ④ arranged from left to right.

DETAILED DESCRIPTION OF ILLUSTRATED EMBODIMENTS

With reference to FIGS. 1A, 1B, 6A, 6B, 19A, 19B, 20, and 21, the polarization-encoded diffractive network 10 contains a plurality of substrate layers 12 that are physical layers which may be formed as a physical substrate or matrix of optically transmissive material (for transmission mode) or optically reflective material (for reflective mode). In transmission mode, light or radiation passes through the substrate layers 12 (as seen in FIGS. 1A, 1B, 6A, 6B, 19, 19B, 20, and 21). Conversely, in reflective mode, light or radiation reflects off the substrate layer(s) 12. Exemplary materials that may be used for the substrate layers 12 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective substrate layers 12.

Figure 19A:
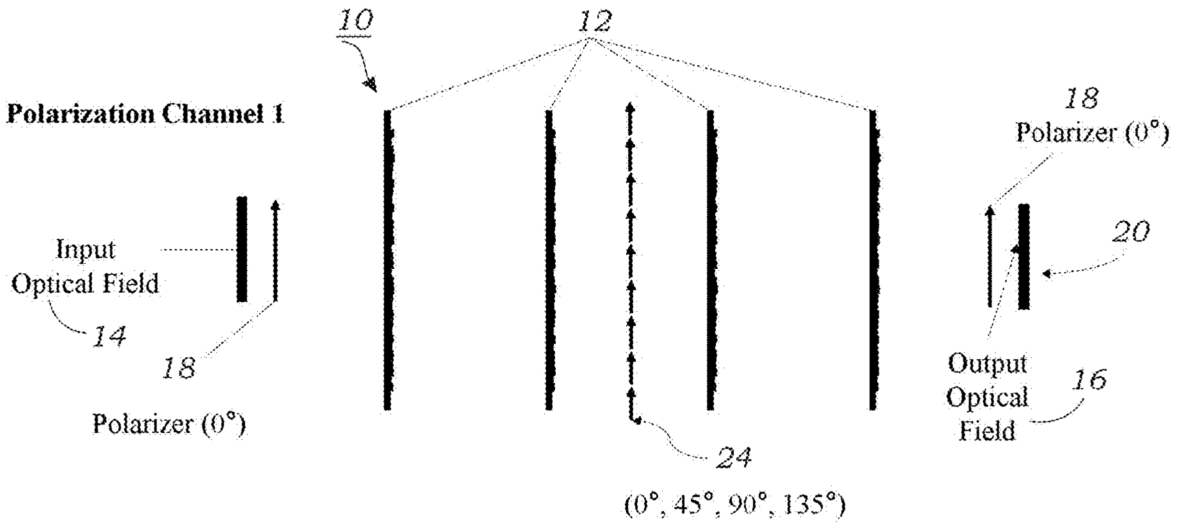
FIGS. 19A-19B schematically illustrates an embodiment of the polarization-encoded diffractive network operating in sequential polarization access" (SeqPA) mode.
Figure 19B:
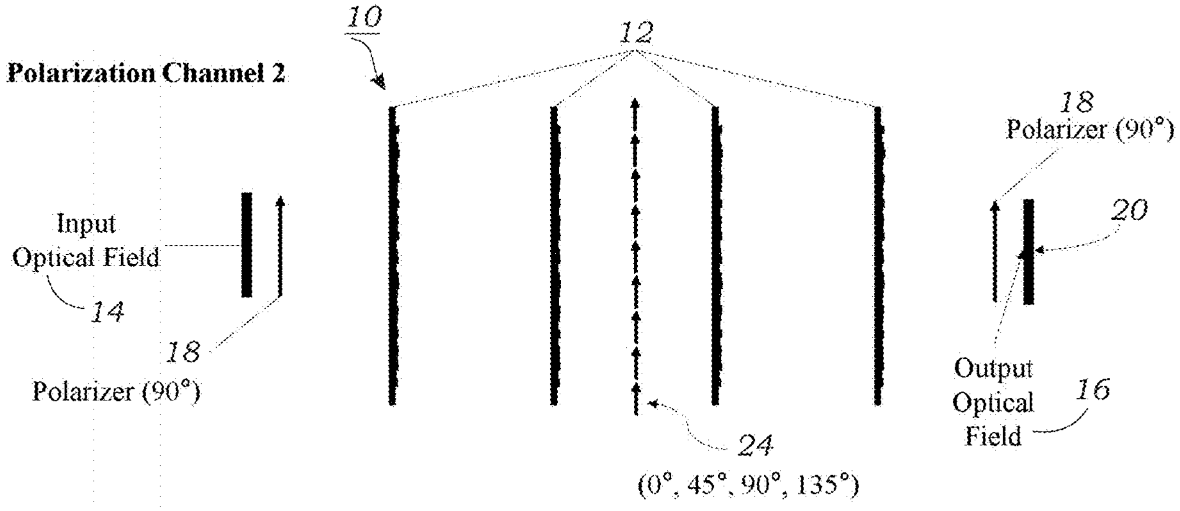
Figure 20:
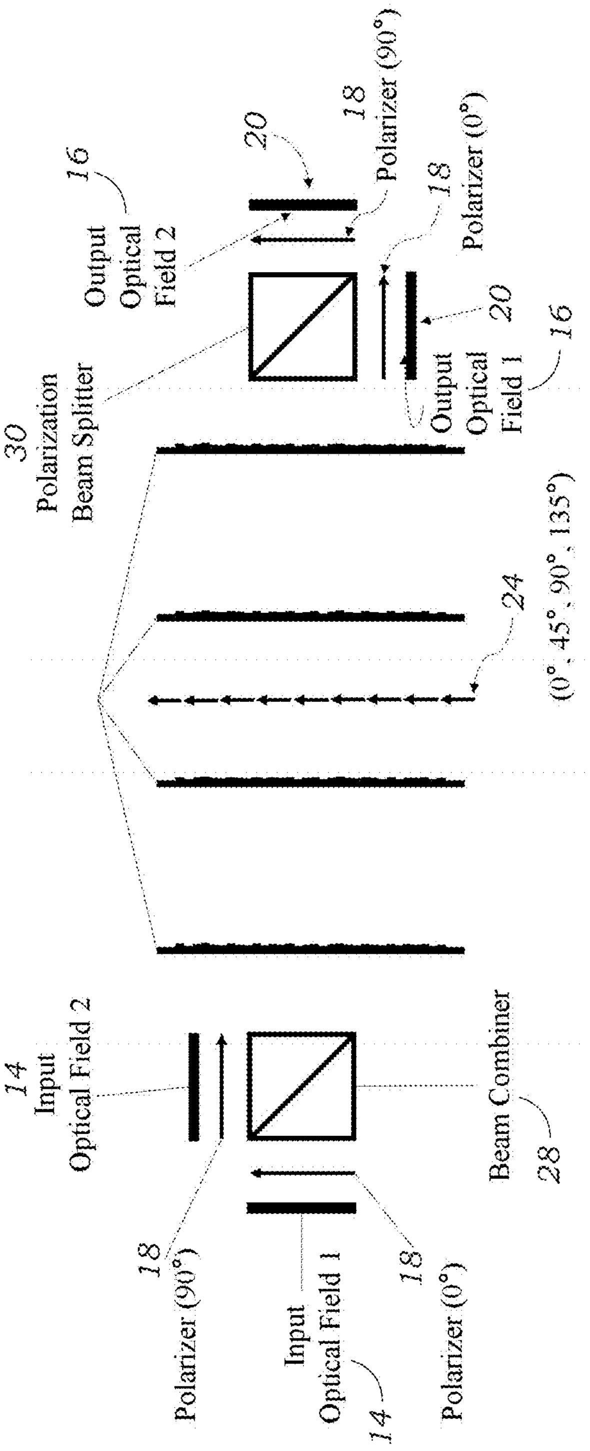
FIG. 20 schematically illustrates an embodiment of the polarization-encoded diffractive network operating in the "simultaneous polarization access" (SimPA) mode.

The input 14 to the polarization-encoded diffractive network 10 is a vectorized optical field as best illustrated in FIGS. 1A, 1B, 6A, 6B, 19A, 19B, 20 and the output 16 of the polarization-encoded diffractive network 10 is also a vectorized optical field that has been subject to the linear transformation(s) encoded by the polarization-encoded diffractive network 10. The input 14 and the output 16 may each comprise an array of pixel values. The input 14 may include a two-dimensional complex data field in one embodiment. The output vectorized optical field 16 is captured by one or more image sensors 20 (seen in FIGS. 19A, 19B, and 20). With reference to FIGS. 19A, 19B, 20, and 21 polarizers 18 are located on the input and output sides of the polarization-encoded diffractive network 10. That is to say a first polarizer 18 is located before the first substrate layer 12 of the polarization-encoded diffractive network 10 while a second polarizer 18 is located after the last substrate layer 12. The output polarizers 18 or "analyzers" act as a filter so that the output optical field 16 seen by the one or more image sensors 20 contains the desired polarization. As seen in FIGS. 19A, 19B, and 20 the different polarizations of the output polarizers 18 are used for different channels.

The polarization-encoded diffractive network 10 operates by light or radiation that includes vectorized optical field as the input 14 enters the optical path that contains one or more optically transmissive and/or reflective substrate layer(s) 12 arranged in the optical path and having one or more polarizer arrays 24 interposed between the one or more optically transmissive and/or reflective substrate layer(s) 12. An output 16 is generated that is captured by one or more image sensors 20. The output 16 that is captured with the one or more image sensors 20 has undergone a plurality of distinct optical transformations as compared to the input 14. The substrate layer(s) 12 together with the polarizer array(s) perform or approximate the plurality of distinct optical transformations.

With reference to FIGS. 15-18, each substrate layer 12 of the polarization-encoded diffractive network 10 has a plurality of physical features 22 formed on the surface of the substrate layer 12 or within the substrate layer 12 itself that collectively define a pattern of physical locations along the length and width of each substrate layer 12 that have varied transmission properties (or varied reflection properties). The physical features 22 formed on or in the substrate layers 12 thus create a pattern of physical locations on or within the substrate layers 12 that have different valued transmission properties as a function of lateral coordinates (e.g., length and width and in some embodiments depth) across each substrate layer 12 (or reflective properties for the reflective mode operation). In some embodiments, each separate physical feature 22 may define a discrete physical location on the substrate layer 12 while in other embodiments, multiple physical features 22 may combine or collectively define a physical region with a particular transmission (or reflection) property. The one or more substrate layers 12 are arranged along the optical path along with the one or more polarizer arrays 24 interposed between the one or more substrate layers 12 and collectively define or approximate a transformation between the vectorized input optical field 14 to the one or more optically transmissive and/or reflective substrate layer(s) 12 and the vectorized output optical field 16 created by optical diffraction through and/or optical reflection from the one or more optically transmissive and/or reflective substrate layer(s) 12 within the polarization-encoded diffractive network 10 reflecting the different transformations to be performed/implemented or approximated by the polarization-encoded diffractive network 10. In one embodiment, the transformation that is implemented or approximated is a linear transformation. For example, the polarizer array(s) 24 may include linear polarizers at a plurality of orientations. In another embodiment, the polarizer array(s) 24 may include circular and/or elliptical polarizers at a plurality of orientations. A single polarization-encoded diffractive network 10 is able to perform a plurality of unique linear transformations assigned to different input/output polarization combinations.

Figure 15:
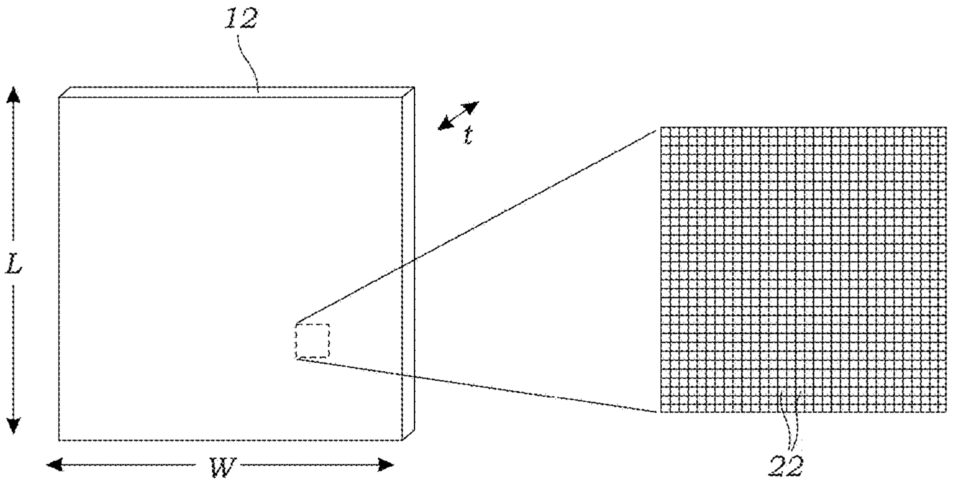
FIG. 15 illustrates a single substrate layer of the polarization-encoded diffractive network. The substrate layer may be made from a material that is optically transmissive (for transmission mode) or an optically reflective material (for reflective mode). The substrate layer, which may be formed as a substrate or plate in some embodiments, has surface features formed across the substrate layer. The surface features form a patterned surface (e.g., an array) having different valued transmission (or reflection) properties as a function of lateral coordinates across each substrate layer. These surface features act as artificial "neurons" that connect to other "neurons" of other substrate layers of the optical neural network through optical diffraction (or reflection) and alter the phase and/or amplitude of the light wave.

The pattern formed by the physical features 22 on or within the substrate layer 12 may define, in some embodiments, an array located across the surface of the substrate layer 12. With reference to FIG. 15, the substrate layer 12 in one embodiment is a two-dimensional generally planer substrate having a length (L), width (W), and thickness (t) that all may vary depending on the particular application. In other embodiments, the substrate layer 12 may be non-planer such as, for example, curved. In addition, while FIG. 15 illustrates a rectangular or square-shaped substrate layer 12 different geometries are contemplated. The physical features 22 and the physical regions formed thereby act as artificial "neurons" that connect to other "neurons" of other substrate layers 12 of the polarization-encoded diffractive network 10 through optical diffraction (and/or reflection) and alter the phase and/or amplitude of the light wave. The particular number and density of the physical features 22 or artificial neurons that are formed in each substrate layer 12 may vary depending on the type of application. In some embodiments, the total number of artificial neurons may only need to be in the hundreds or thousands while in other embodiments, hundreds of thousands or millions of neurons or more may be used. Likewise, the number of substrate layers 12 that are used in a particular polarization-encoded diffractive network 10 may vary although it typically ranges from at least two (2) substrate layers 12 to less than ten (10) substrate layers 12.

After a last substrate layer 12 in the optical path, one or more image sensors 20 (which may include detector array(s)) is/are provided that captures vectorized output optical field 16. It should be appreciated that in some embodiments a polarizer 18 is interposed between the last substrate layer 12 and the one or more image sensors 20 and filters the vectorized output optical field 16 so that it contains the desired polarization. The image sensor 20 may include, for example, a CMOS image sensor or image chip such as CCD, although the image sensor(s) 20 may also include photodetectors (e.g., photodiode such as avalanche photodiode detector (APD)), photomultiplier (PMT) device, detector array(s), and the like.

Figure 16:
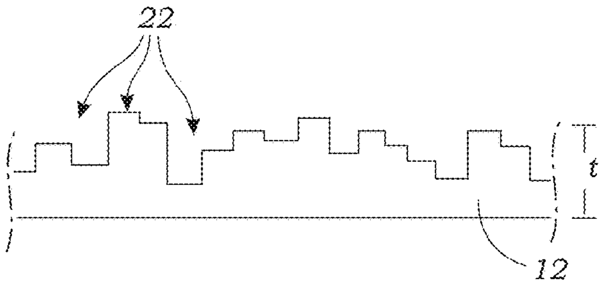
FIG. 16 schematically illustrates a cross-sectional view of a single substrate layer of a polarization-encoded diffractive network according to one embodiment. In this embodiment, the surface features are formed by adjusting the thickness of the substrate layer that forms the optical neural network. These different thicknesses may define peaks and valleys in the substrate layer that act as the artificial "neurons."

FIG. 16 illustrates one embodiment of how different physical features 22 are formed in the substrate layer 12. In this embodiment, a substrate layer 12 has different thicknesses (t) of material at different lateral locations along the substrate layer 12. In one embodiment, the different thicknesses (t) modulates the phase of the light passing through the substrate layer 12. This type of physical feature 22 may be used, for instance, in the transmission mode embodiment of FIGS. 1A, 1B. 6A. 6B, 19A, 19B, 20, and 21. The different thicknesses of material in the substrate layer 12 forms a plurality of discrete "peaks" and "valleys" that control the transmission properties of the neurons formed in the substrate layer 12. The different thicknesses of the substrate layer 12 may be formed using additive manufacturing techniques (e.g., 3D printing) or lithographic methods utilized in semiconductor processing. For example, the design of the substrate layers 12 may be stored in a stereolithographic file format (e.g., .stl file format) which is then used to 3D print the substrate layers 12. Other manufacturing techniques include well-known wet and dry etching processes that can form very small lithographic features on a substrate layer 12. Lithographic methods may be used to form very small and dense physical features 22 on the substrate layer 12 which may be used with shorter wavelengths of the light. As seen in FIG. 16, in this embodiment, the physical features 22 are fixed in permanent state (i.e., the surface profile is established and remains the same once complete).

Figure 17:
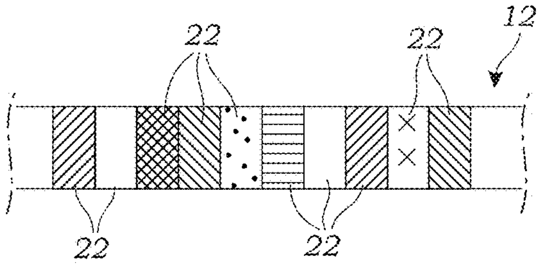
FIG. 17 schematically illustrates a cross-sectional view of a single substrate layer of a polarization-encoded diffractive network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 17 illustrates another embodiment in which the physical features 22 are created or formed within the substrate layer 12. In this embodiment, the substrate layer 12 may have a substantially uniform thickness but have different regions of the substrate layer 12 have different optical properties. For example, the refractive (or reflective) index of the substrate layers 12 may altered by doping the substrate layers 12 with a dopant (e.g., ions or the like) to form the regions of neurons in the substrate layers 12 with controlled transmission and/or reflection properties (or absorption and/or spectral features). In still other embodiments, optical nonlinearity can be incorporated into the network design using various optical non-linear materials (e.g., crystals, polymers, semiconductor materials, doped glasses, polymers, organic materials, semiconductors, graphene, quantum dots, carbon nanotubes, and the like) that are incorporated into the substrate layer 12. A masking layer or coating that partially transmits or partially blocks light in different lateral locations on the substrate layer 12 may also be used to form the neurons on the substrate layers 12.

Alternatively, the transmission function of the physical features 22 or neurons can also be engineered by using metamaterial or plasmonic structures. Combinations of all these techniques may also be used. In other embodiments, non-passive components may be incorporated into the substrate layers 12 such as spatial light modulators (SLMs). SLMs are devices that imposes spatial varying modulation of the phase, amplitude, or polarization of a light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

Figure 18:
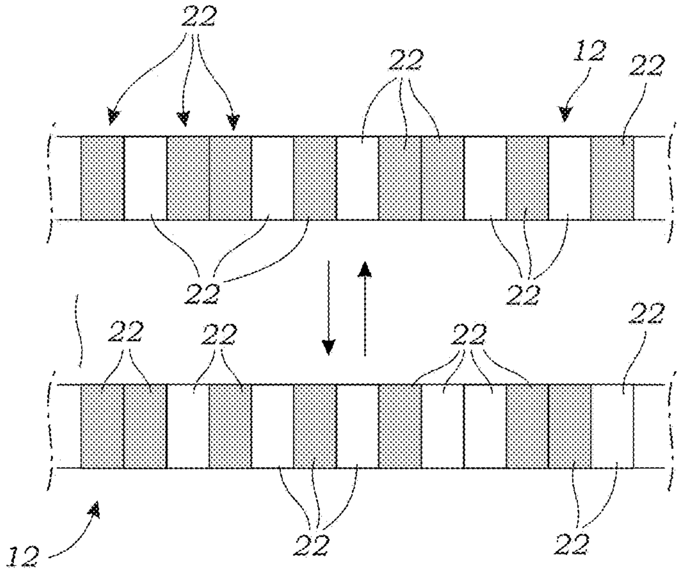
FIG. 18 schematically illustrates a cross-sectional view of a single substrate layer of a polarization-encoded diffractive network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning diffractive network or a changeable diffractive network that can be altered on-the-fly (e.g., over time) to improve the performance, compensate for aberrations, or even change another task.

FIG. 18 schematically illustrates a cross-sectional view of a single substrate layer 12 of a polarization-encoded diffractive network 10 according to another embodiment. In this embodiment, the substrate layer 12 is reconfigurable in that the optical properties of the various physical features 22 that form the artificial neurons may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the substrate layers 12 of the polarization-encoded diffractive network 10 and require a DC electric-field for each substrate layer 12 of the polarization-encoded diffractive network 10. This electric-field (or electric current) can be externally applied to each substrate layer 12 of the polarization-encoded diffractive network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning polarization-encoded diffractive network 10 or a changeable polarization-encoded diffractive network 10 that can be altered on-the-fly to improve the performance, compensate for aberrations, or even change another task.

As explained herein, a computerized or digital model of the polarization-encoded diffractive network 10 is first digitally trained using a computing device. Here, the digital model of the polarization-encoded diffractive network 10 is trained to all-optically perform a plurality of arbitrarily-selected linear transformations. Software that is executed by a computing device digitally trains a model or mathematical representation of the multi-layer diffractive and/or reflective substrate layers 12 used within the polarization-encoded diffractive network 10 to perform the selected linear transformations. This training establishes the particular transmission and/or reflection properties of the physical features 22 and/or neurons formed in the substrate layers 12 to perform the different linear transformations.

Figure 21:
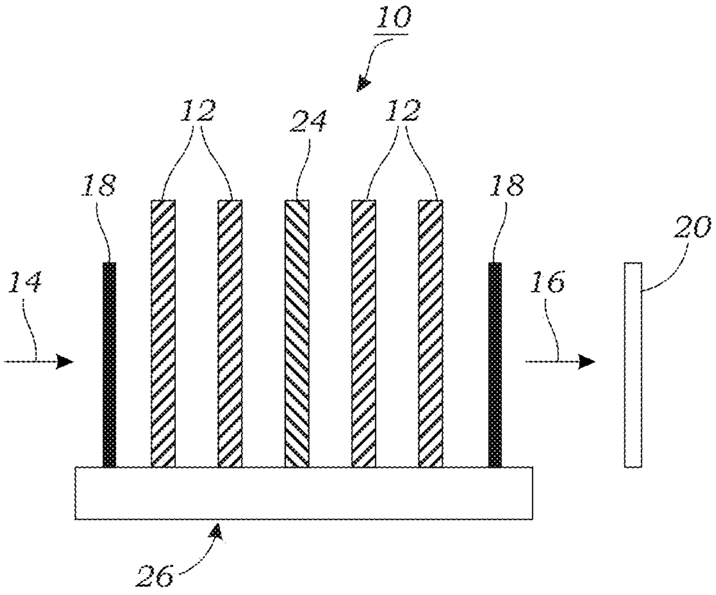
FIG. 21 illustrates a polarization-encoded diffractive network with a holder that holds the substrate layers and the polarizers.
Figure 22B:
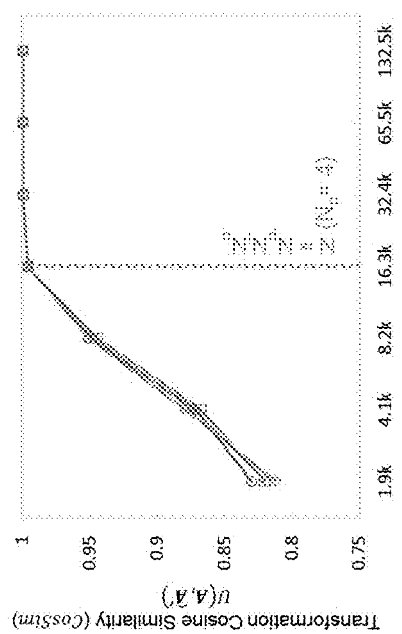
FIGS. 22A-22D illustrates diffractive all-optical transformation results for 4-channel polarization multiplexing of four distinct arbitrary linear transforms using orthogonal circular polarization states at the input field-of-view. Left- and right-hand circular polarization states (i.e., LHCP and RHCP) are used at the input of a polarization-multiplexed diffractive network to encode the input information, and x and y linear polarization states are used at the output of the diffractive network. Four different, arbitrarily-selected, complex-valued linear transformations were each assigned to one combination of circular-linear polarization.
Figure 22A:
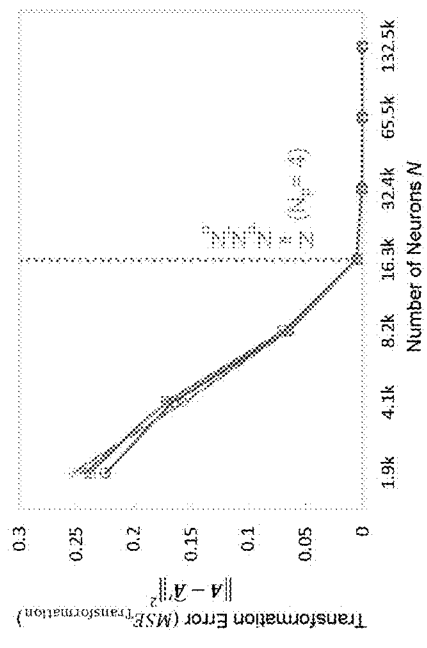
Figure 22D:
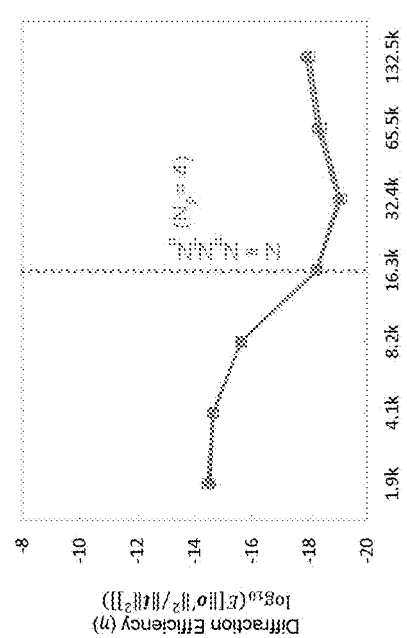
Figure 22C:
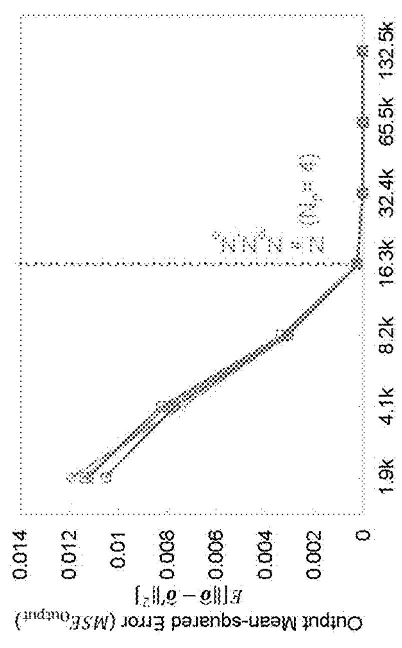

Next, using the established or trained model and design for the physical embodiment of the polarization-encoded diffractive network 10, the actual substrate layers 12 used in the physical embodiment (FIGS. 19A, 19B, 20, 21) of the polarization-encoded diffractive network 10 are then manufactured in accordance with the model or design. The design, in some embodiments, may be embodied in a software format (e.g., SolidWorks, AutoCAD, Inventor, or other computer-aided design (CAD) program or lithographic software program) and may then be manufactured into a physical embodiment that includes the plurality of substrate layers 12 having the tailored physical features 22 formed therein/thereon. The physical substrate layers 12, once manufactured may be mounted or disposed in a holder 26 as seen in FIG. 21 to maintain the appropriate spacing between the substrate layers 12. The holder 26, for example, may include a number of slots formed therein to hold the individual substrate layers 12, the polarizer array(s) 24, and/or the polarizers 18 in the required sequence and with the required spacing between adjacent substrate layers 12 and the polarizer array(s) 24. The components held in the holder 26 may be removable. The physical substrate layers 12 and the polarizer array(s) 24 may also be integrated into a monolithic structure in other embodiments. The substrate layers 12 may also be incorporated into a waveguide like an optical fiber.

FIGS. 19A and 19B schematically illustrate an embodiment of the polarization-encoded diffractive network 10 operating in "sequential polarization access" (SeqPA) mode. In this mode, two different modes of polarization through the same polarization-encoded diffractive network 10 is done sequentially. Specifically, for the first channel, the input optical field 12 is input to the polarization-encoded diffractive network 10 with the polarizers 18 in a first configuration (e.g., 0). This is followed by inputting the same polarization-encoded diffractive network 10 with the polarizers 18 in a second polarization configuration (e.g., 90°). The output optical fields 14 are captured by the image sensor 20. The different polarization states may be accomplished by swapping out different polarizers 18 or repositioning the polarizers 18.

FIG. 20 schematically illustrates an embodiment of the polarization-encoded diffractive network 10 operating in the "simultaneous polarization access" (SimPA) mode. In this mode, two different modes of polarization through the same polarization-encoded diffractive network 10 is done simultaneously. A beam combiner 28 and beam splitter 30 are used, respectively, at the front and back ends of the polarization-encoded diffractive network 10 for simultaneous polarization along two different channels. Specifically, for the first channel, the input optical field 14 (e.g., input optical field 1) is input to the polarization-encoded diffractive network 10 with a corresponding set of polarizers 18 in a first configuration (e.g., 0°). At the same time, the input optical field 14 (e.g., input optical field 2) is input to the same polarization-encoded diffractive network 10 with a corresponding second set of polarizers 18 in a second polarization configuration (e.g., 90°). Separate image sensors 20 along with respective polarizers 18 interposed in the optical path from the last substrate layer 12 and the respective image sensors 20 are used to capture the respective output optical fields 16 (e.g., output optical field 1 and output optical field 2).

The distinct optical transformations performed by the polarization-encoded diffractive network 10 may include a number of operations or tasks. For example, the one or more distinct optical transformations may include at least one of: object classification, object segmentation, object imaging, object detection, object image filtering, object image compression, object image encryption, and an analog logical operation.

The light or radiation that is passed through the polarization-encoded diffractive network 10 may include light emitted from a number of different types of light sources. This may include narrowband or broadband sources. In addition, different portions of the electromagnetic spectrum may be used. This includes ultra-violet, visible, infrared, terahertz, or microwave parts of the electromagnetic spectrum.

EXPERIMENTAL

Results

Figures 1A, 1B:
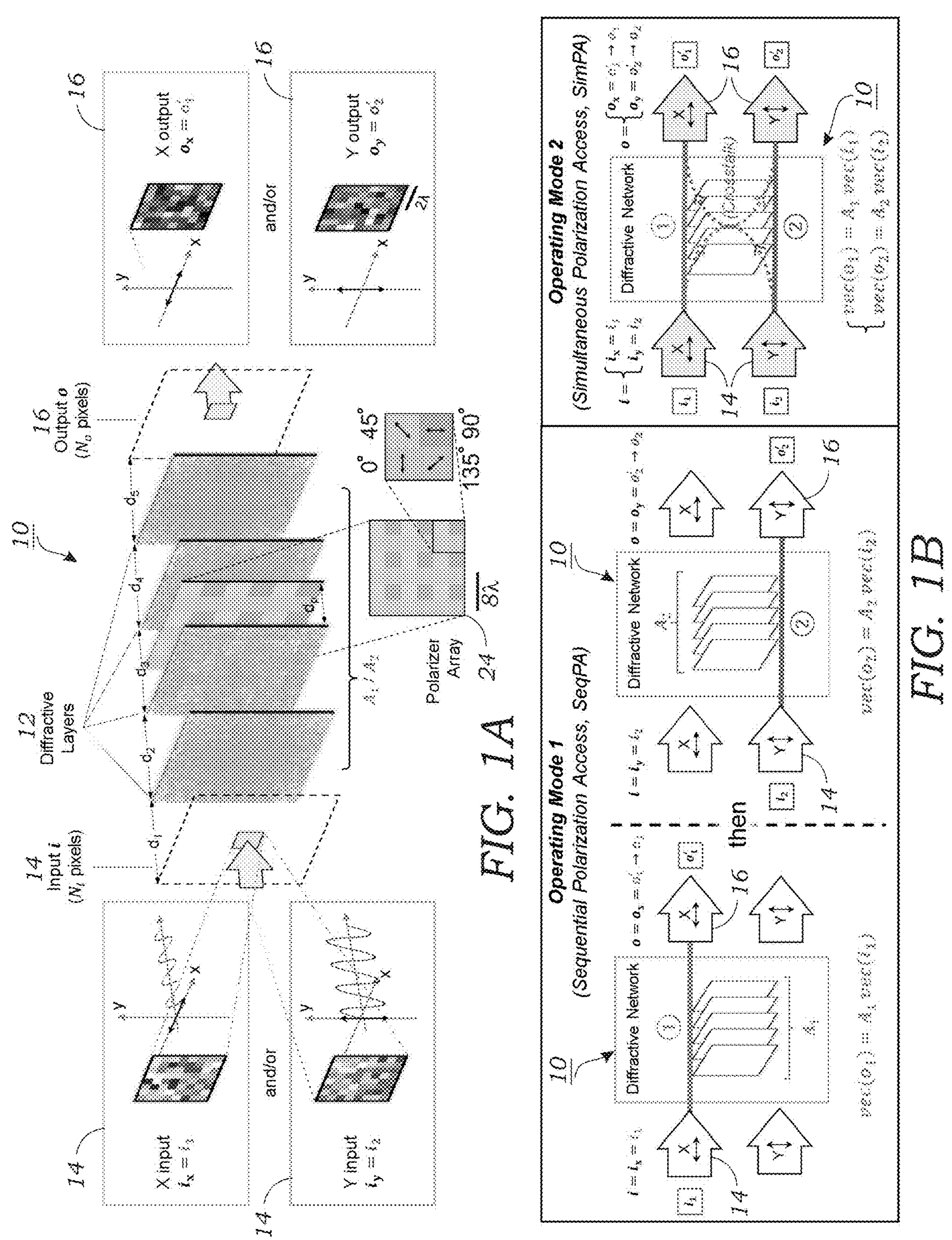
FIGS. 1A and 1B schematically illustrate embodiments of polarization multiplexed all-optical diffractive computing. FIG. LA illustrates the optical layout of the polarization-encoded diffractive network, where four isotropic diffractive layers and one array of linear polarizers are jointly used to perform two distinct, complex-valued linear transformations between the input field i and the output field o by using polarization encoding/decoding at the input/output FOVs.

Throughout this Experimental section, the terms "diffractive optical network," "diffractive network," and "diffractive processor" are interchangeably used and describe the polarization-encoded diffractive network 10. The schematic of the framework for 2-channel polarization multiplexed all-optical computing ($N_p=2$) is shown in FIG. 1A. A polarization-encoded diffractive neural network 10, composed of four (4) trainable substrate layers 12, is trained to all-optically perform two (2) distinct, complex-valued linear transformations between the input and output FOVs through two (2) orthogonal polarization channels. The pre-determined polarizer array 24 (which is treated as non-trainable) consists of multiple repeating linear polarizer units with four different polarization directions: 0°, 45°, 90° and 135°. This non-trainable polarizer array 24 is positioned close to the center of the diffractive volume (i.e., between the $2^{nd}$ and $3^{rd}$ trainable diffractive layers 12) so that the resulting polarization modulation does not directly dominate the output field; the former and latter diffractive layers are jointly optimized to effectively communicate with the polarizer array 24 and all-optically implement the desired group of linear transformations. More details about the architecture, optical forward model and training details of the polarization diffractive network 10 can be found in the Methods section.

i and o are used to denote the complex-valued, vectorized versions of the 2D input and output complex fields 14, 16 located at the input and output FOVs of the diffractive network 10, respectively, as presented in FIG. 1A. Based on the scalar diffraction theory, here, $i_x$ and $o_x$ represent the column vectors of the complex fields generated by sampling the x-polarized optical fields within the input and output FOVs, respectively, and vectorizing the resulting 2D matrices in a column-major order. Similar to $i_x$ and $o_x$, $i_y$ and $o_y$ are their counterparts generated by sampling the y-polarized optical fields within the input and output FOVs, respectively. Based on this notation, $(i_x, i_y)$ and $(o_x, o_y)$ can be considered to represent the input and output channels of the polarization multiplexed diffractive network 10, respectively. In the analyses performed, the number of pixels in the input and output FOVs are both taken as $N_i=N_o=8^2=64$, such that each target linear transformation matrix has $64^2$ complex-valued entries.

Figure 2A:
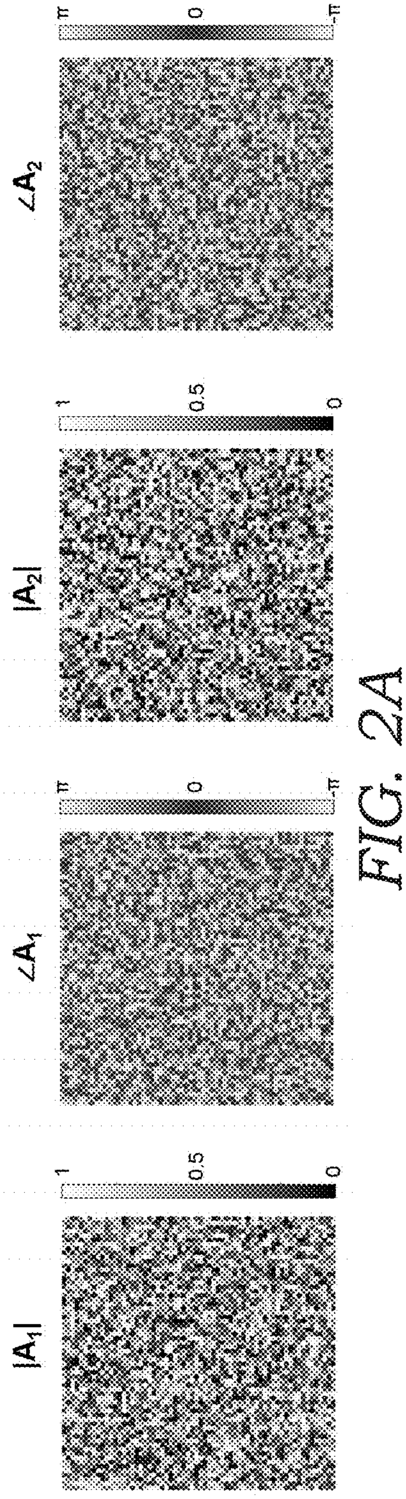
FIGS. 2A-2E illustrate diffractive all-optical transformation results for 2-channel polarization multiplexing using the sequential polarization access (SeqPA) mode.
Figure 8:
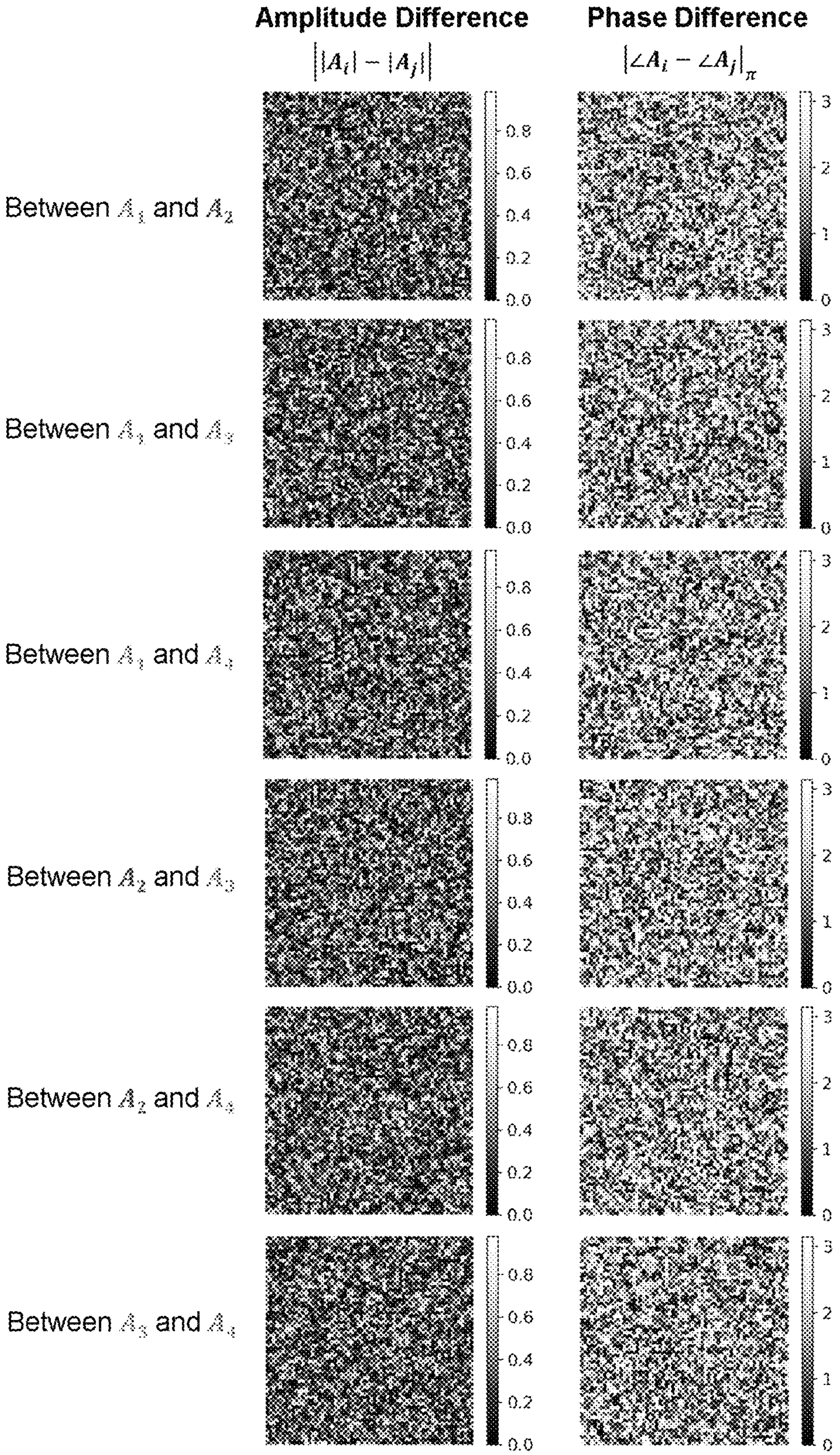
FIG. 8: Phase and amplitude differences between the linear transformation matrices ($A_1$, $A_2$, $A_3$ and $A_4$).
Figures 9A, 9B, 9C, 9D:
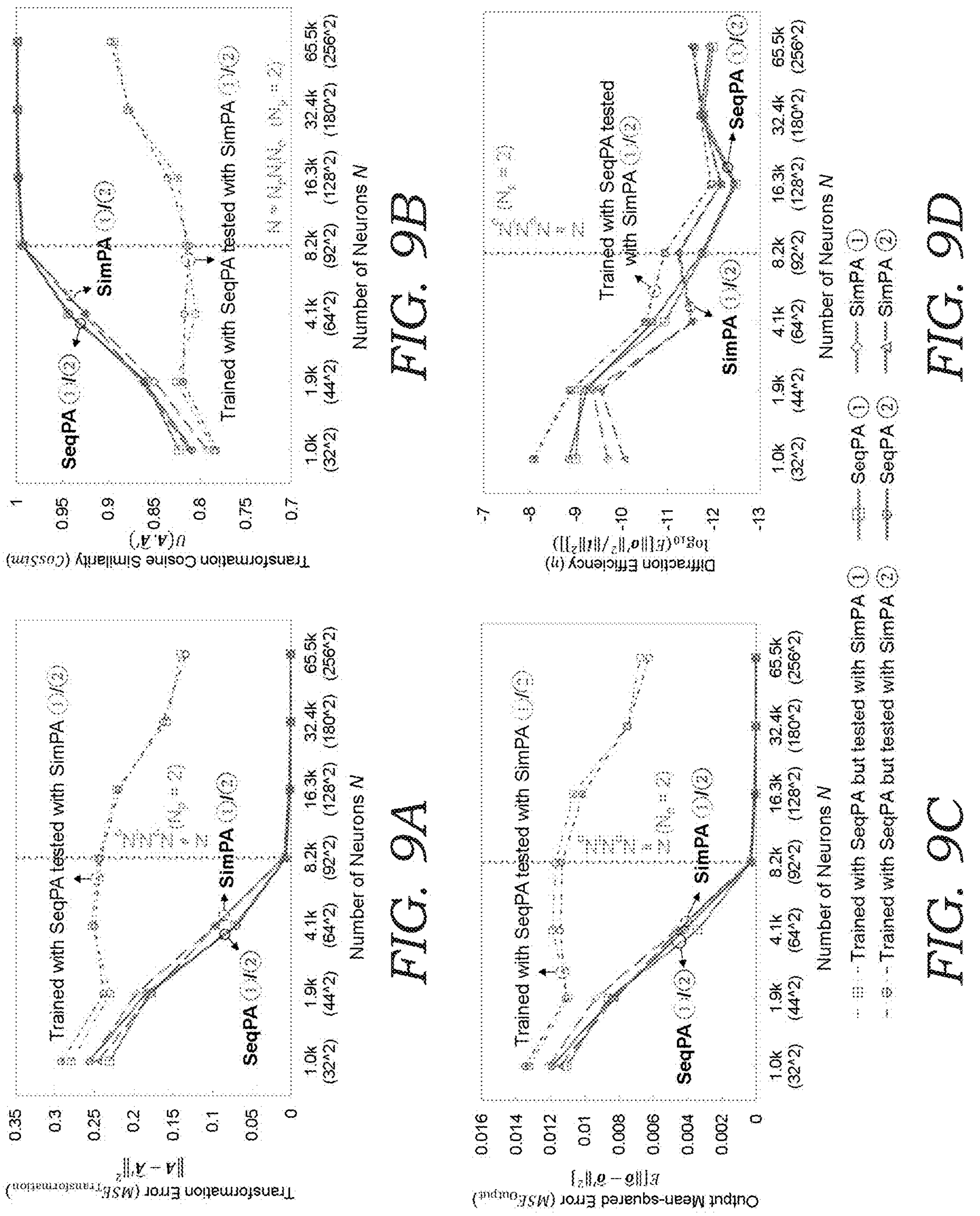
FIGS. 9A-9D: Diffractive all-optical transformation results of blindly testing the SeqPA-trained 2-channel polarization multiplexed diffractive networks under the SimPA mode.
Figure 10A:
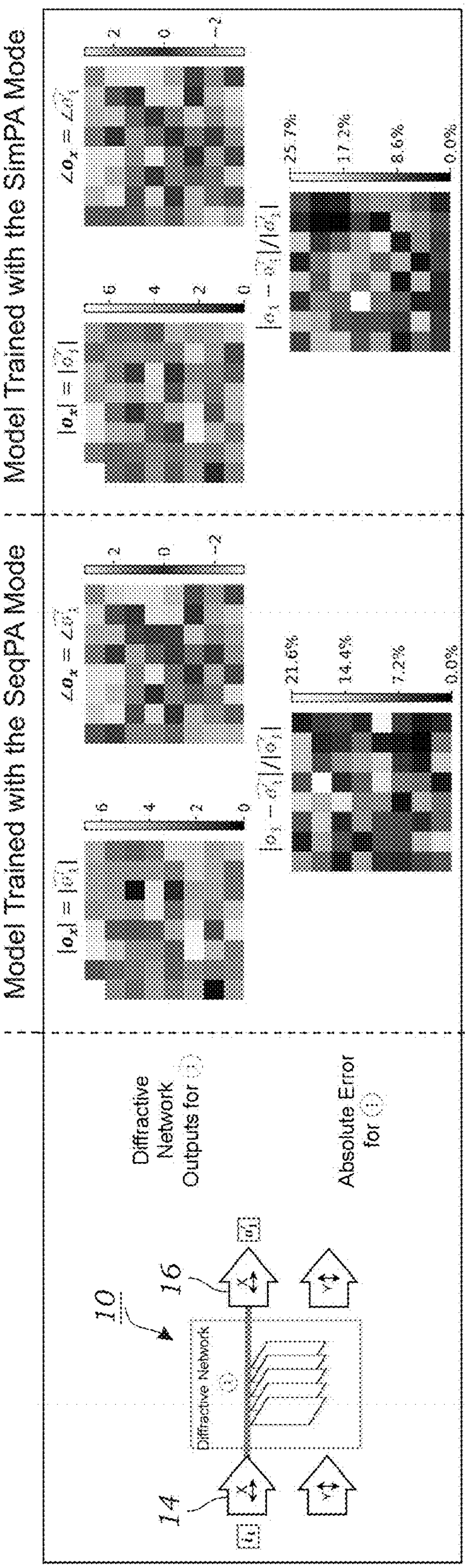
FIGS. 10A-10E: Crosstalk analysis of the 2-channel polarization multiplexed diffractive networks trained using the SeqPA and SimPA modes. Note that $o'_{12}$ represents the crosstalk component from the polarization channel ① to ② measured at the output field of the diffractive network, while $o'_{21}$ represents the crosstalk component from the polarization channel ② to ① measured at the output field of the diffractive network.
Figure 10B:
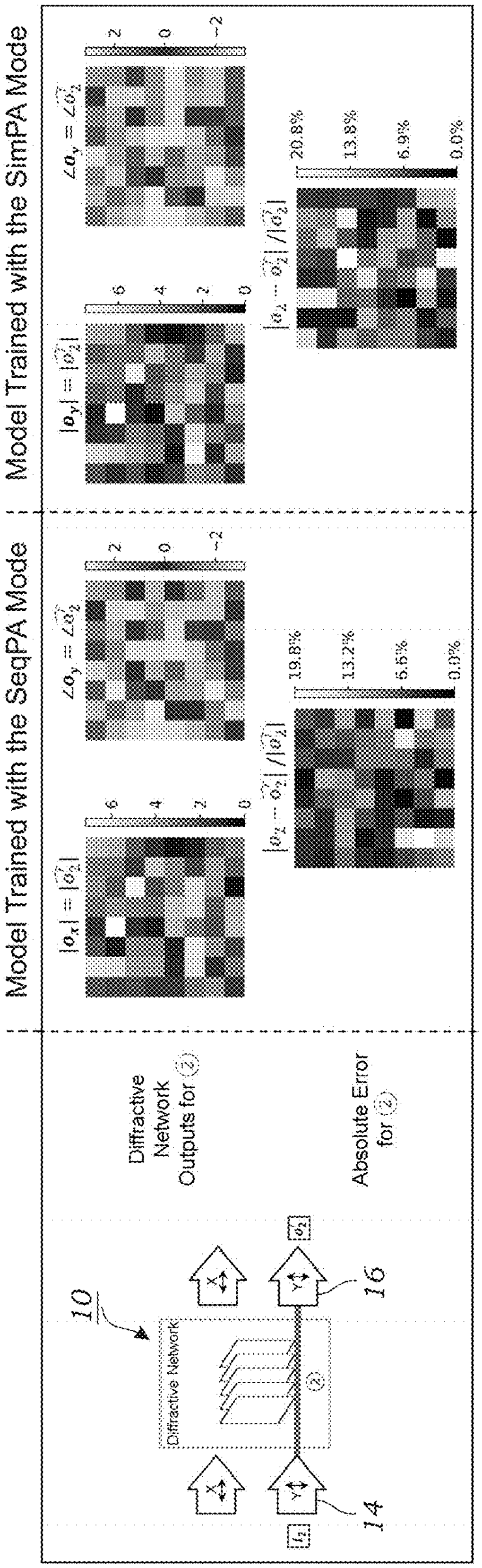
Figure 10C:
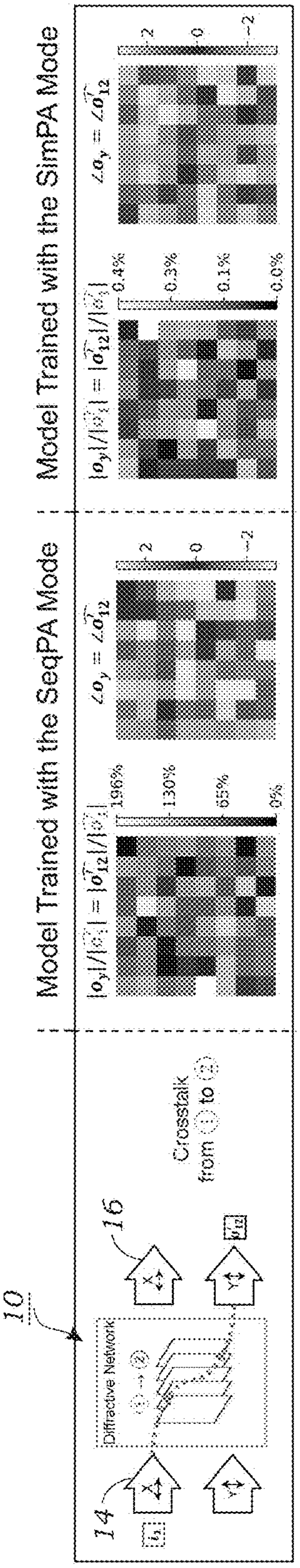
Figure 10D:
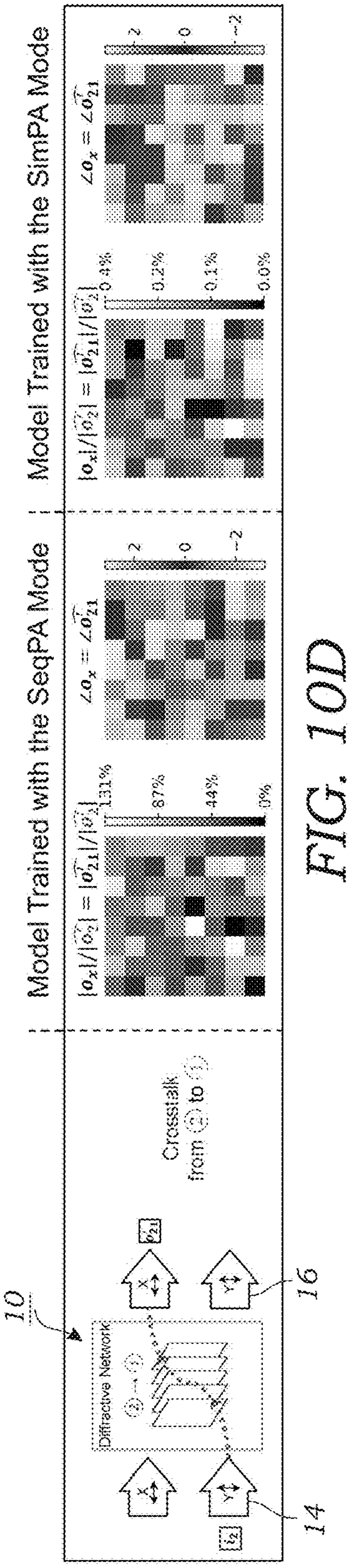
Figure 10E:
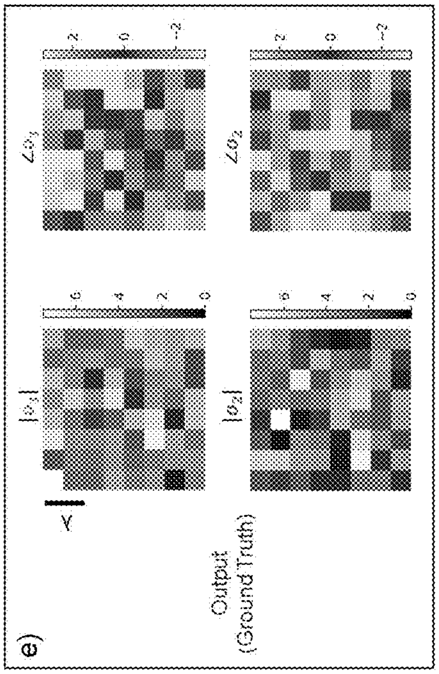

In this first implementation with $N_p=2$, generated two complex-valued matrices $A_1$ and $A_2$, were randomly generated each with a size of $N_i \times N_o=64^2$, to serve as two unique arbitrary linear transformations that were used to all-optically implement using a single polarization diffractive network 10. Visualized in FIG. 2A with their amplitude and phase components, these two matrices are independently generated using different random seeds, and the difference between the two matrices can be found in FIG. 8. Two training sets of complex-valued vectors $\{i_1\}$ and $\{i_2\}$ with $N_i=64$ as input fields were randomly generated, and constructed the corresponding sets of output field vectors $\{o_1\}$ and $\{o_2\}$ using $o_1=A_1 i_1$ and $o_2=A_2 i_2$, respectively. For each one of these training sets, $\{i_1\}$ and $\{i_2\}$, 55,000 randomly generated complex fields were used in the training process. A further increase in the size of this training dataset (to e.g., >100,000 randomly generated complex fields) could improve the transformation approximation accuracy of the trained diffractive networks, but would not change the general conclusions and therefore is left as future work.

Based on the given inputs of $\{i_1\}$ and $\{i_2\}$, the ultimate goal of training the polarization-encoded diffractive network 10 is to simultaneously compute the all-optical output fields $\{o'_1\}$ and $\{o'_2\}$ to come close to the output ground truth (target) fields $\{o_1\}$ and $\{o_2\}$; this way, the all-optical transformations $$A'_1 \text{ and } A'_2$$

performed by the trained single diffractive system represent an accurate approximation to their ground truth (target) transformation matrices $A_1$ and $A_2$. It should be emphasized that the aim was not to train the diffractive network to implement the correct linear transformations for only a few input-output field pairs. Instead, despite the limited number of input/output field patterns used during the training process, the goal is to generalize to any pairs of $(i_1, o_1)$ and $(i_2, o_2)$ that satisfy $o_1=A_1 i_1$ and $o_2=A_2 i_2$. More details about the training data generation can be found in Methods.

To form two unique diffractive information processing pipelines in the same diffractive network 10 for performing the linear transformations given by $A_1$ and $A_2$, as shown in FIG. 1A the input fields and the diffractive output pairs, $$\{(i_1, o'_1)\} \text{ and } \{(i_2, o'_2)\}$$

were matched, with the input and output polarization channels of the diffractive system, i.e., $$i_x = i_1, i_y = i_2, o_x = o'_1 \text{ and } o_y = o'_2.$$

That is to say, the $$A'_1$$

transformation is performed by encoding the corresponding input field data $i_1$ into the x-polarized optical field within the input FOV, using e.g., an x-aligned linear polarizer 18, and decoding (sampling) the x-polarized component of the field within the output FOV as the computed output field $$o'_1$$

using e.g., an x-polarized analyzer 18. One can denote this diffractive information processing channel as the channel ① in FIG. 1B. It is also a similar case for the $A'_2$ transformation, except this time the y-polarization is employed at the input and output FOVs. and this diffractive information processing channel is denoted as the channel ②. With this polarization encoding scheme, there are potentially two modes to perform the data inference through the same diffractive network 10: (1) in two sequential, successive accesses to the diffractive system, each time feeding the input data using its assigned polarization channel, and obtaining the corresponding output (see FIG. 1B, left); and (2) in single access to the diffractive system, by feeding the input data of both of the two polarization channels in parallel, and obtaining the two corresponding outputs simultaneously (see FIG. 1B, right). The former and latter approaches were termed as the "sequential polarization access" (SeqPA) mode and the "simultaneous polarization access" (SimPA) mode, respectively.

It should be emphasized that the fundamental difference between these two modes of operation lies in the input information: the SimPA mode can simultaneously accept both of the input polarization states (e.g., x and y polarization) for encoding two different channels of input information, while the SeqPA mode can accept a single polarization state as its input so that only one channel of input information is encoded at a given time. Therefore, if the input FOV simultaneously encodes the data to be processed in two different polarization states, or if the time lag caused by switching between different input polarization states is unacceptable (such as e.g., an input FOV that includes a rapidly changing dynamic scene with specific polarization information), then only the SimPA mode would be suitable to process the input encoding. Conversely, if the system is only required to compute a single linear transformation at a given time, or if the time lag caused by switching back and forth between two different input polarization states is acceptable, then SeqPA mode can be used. Detailed analyses of these two modes of operation are presented in the following subsections.

2-Channel Polarization Multiplexed all-Optical Diffractive Computing Using the Sequential Polarization Access (SeqPA) Mode As shown in FIG. 1B, left, with the input data $i_1$ and $i_2$ being separately and sequentially fed into the polarization channels ① and ②, respectively, the all-optical computed outputs $o'_1$, and $o'_2$ are also collected successively using the same diffractive network hardware. By employing this SeqPA strategy, polarization multiplexed diffractive networks were trained with different numbers of trainable diffractive neurons, i.e., $N=\{32^2, 44^2, 64^2, 92^2, 128^2, 180^2, 256^2\}$, all using the same training datasets $\{(t_1, o_1)\}$ and $\{(i_2, o_2)\}$ and the same number of epochs. To benchmark the performances of these multiplexed diffractive networks, for each transformation dataset and N, regular diffractive networks were trained without the polarizer array or any polarization encoding/decoding at the input/output FOVs, which constitute the baseline. These regular diffractive networks, denoted as "No pol." In the analyses, are trained to approximate only one linear transformation (i.e., either $A_1$ or $A_2$), and therefore they are referred to as $N_p=1$ (no polarization multiplexing).

Figure 2B:
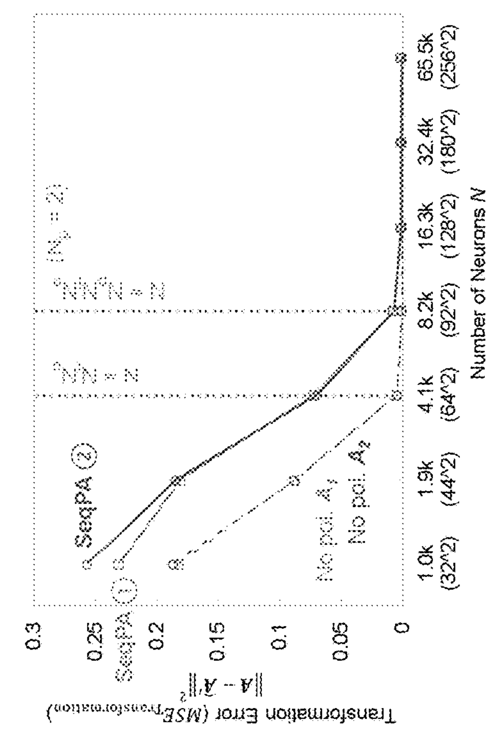
Figure 2C:
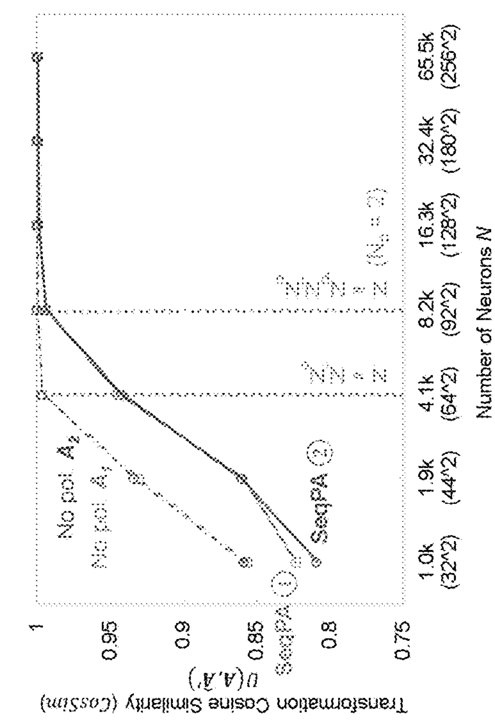
Figure 2D:
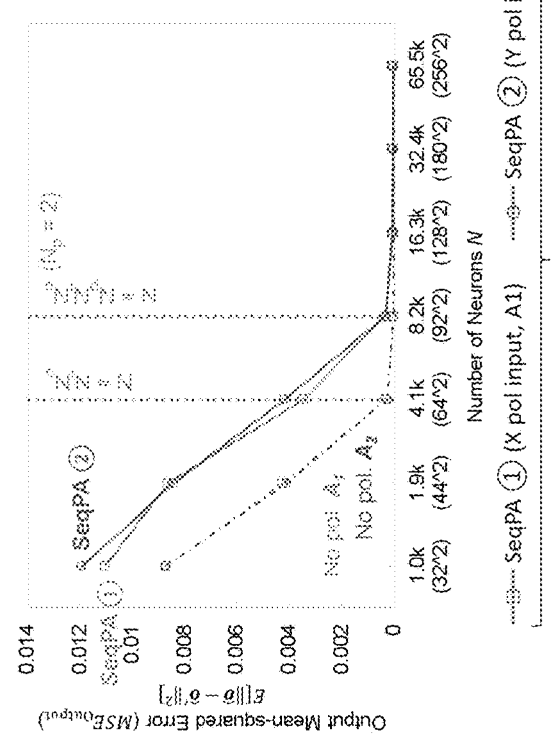
Figure 2E:
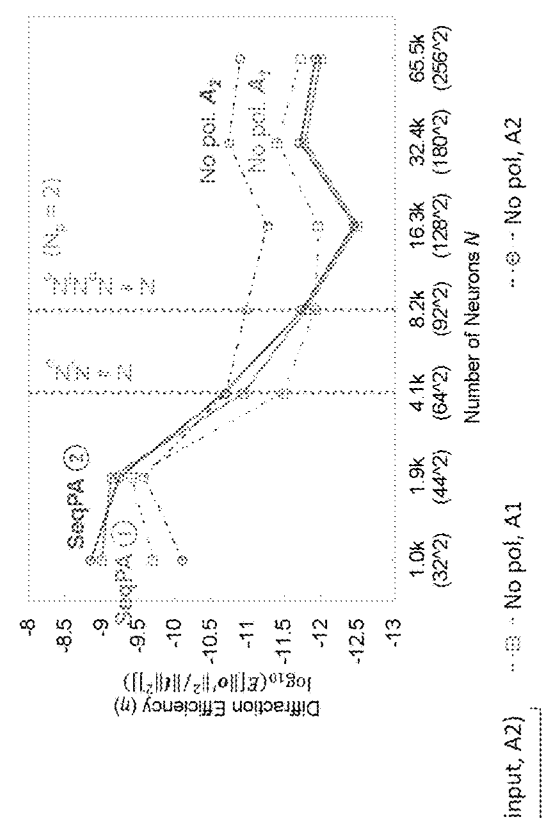

FIGS. 2B-2E present the quantitative comparison of the all-optical transformation results obtained using the trained diffractive networks described above. Three different metrics were used to quantify the transformation accuracy and generalization performance of these diffractive networks: (1) the normalized transformation mean-squared error ($MSE_{Transformation}$), (2) the cosine similarity (CosSim) between the all-optical transforms and the target transforms, and (3) the mean-squared error between the diffractive network output fields and their ground truth ($MSE_{output}$). These performance metrics are reported in FIGS. 2B,2C, 2D, as a function of the number of diffractive neurons (N) used in each design. Note that the transformation error of the polarization multiplexed diffractive systems is calculated per polarization channel. More details about the formulations of these performance metrics can be found in Methods. In FIG. 2B, it can be seen that the transformation errors of all the trained diffractive models monotonically decrease as N increases, which is expected due to the increased degrees of freedom in the diffractive processor. In the standard diffractive networks without polarization multiplexing (dash-dotted curves labeled with "No pol. $A_1$" or "No pol. $A_2$"), the transformation errors for implementing $A_1$ or $A_2$ are almost the same (which indicates that these randomly selected matrices. $A_1$ and $A_2$, represent similar computational complexity: also see FIG. 8). The approximation errors of these standard diffractive networks. No pol. $A_1$ and No pol. $A_2$, both approach to 0 as N approaches $N_iN_o=64^2\approx4.1$ k. In the polarization multiplexed diffractive models (solid curves labeled with "SeqPA ①" or "SeqPA ②"), the transformation errors $MSE_{Transformation}$ for the two distinct transforms computed through the two polarization channels are also very close to each other for all values of N, demonstrating no bias toward any specific polarization channel or transform. The approximation errors of these polarization multiplexed models approach to 0 as N approaches $N_pN_iN_o=2N_iN_o=92^2\approx8.2$ k. This finding indicates that compared with the baseline diffractive models that can only perform a single transform, performing two unique transforms using polarization multiplexing through the same diffractive model requires the number of trainable neurons N to double. This conclusion is further supported by the results of the other two performance metrics, CosSim (FIG. 2C) and $MSE_{output}$ (FIG. 2D) that both show the same trends as in FIG. 2B: for the baseline diffractive models CosSim and $MSE_{Output}$ approach 1 and 0 as N approaches $N_iN_o$, respectively, while for the polarization multiplexed diffractive models, the two metrics approach 1 and 0 as N approaches $N_pN_iN_o=2N_iN_o$. Apart from the metrics that are used to evaluate the transformation performance, the output diffraction efficiencies (η) of these diffractive models are reported in FIG. 2E, which reveal that compared with the baseline diffractive networks (No pol.), the diffraction efficiencies of the polarization multiplexed diffractive models trained using the SeqPA mode reach a similar level.

Figure 3:
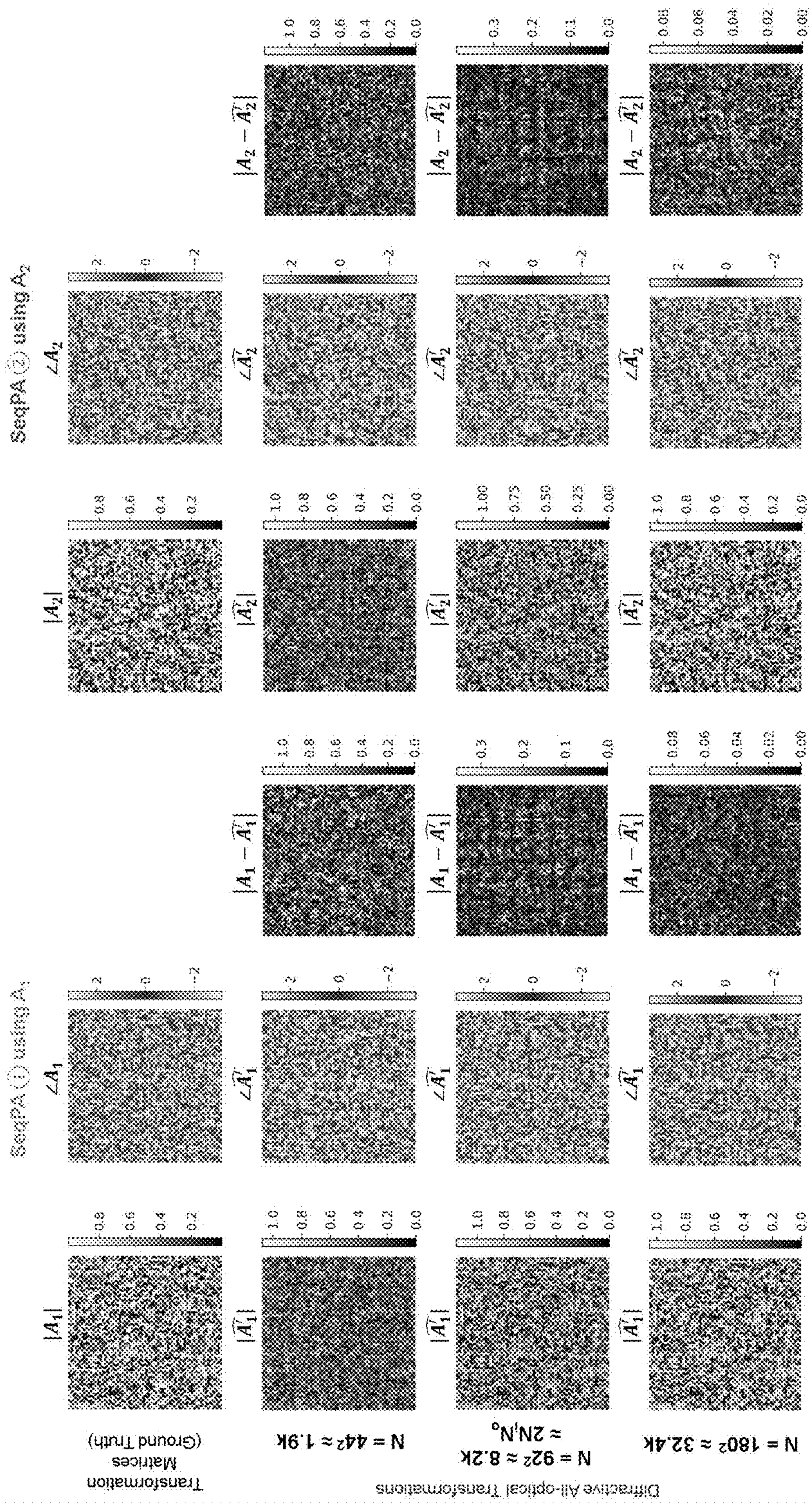
FIG. 3 illustrates all-optical transformation matrices estimated by the 2-channel polarization multiplexed diffractive designs trained using the SeqPA mode with $N=44^2$, $92^2$ and $180^2$, and their differences from the ground truth matrices.
Figure 4:
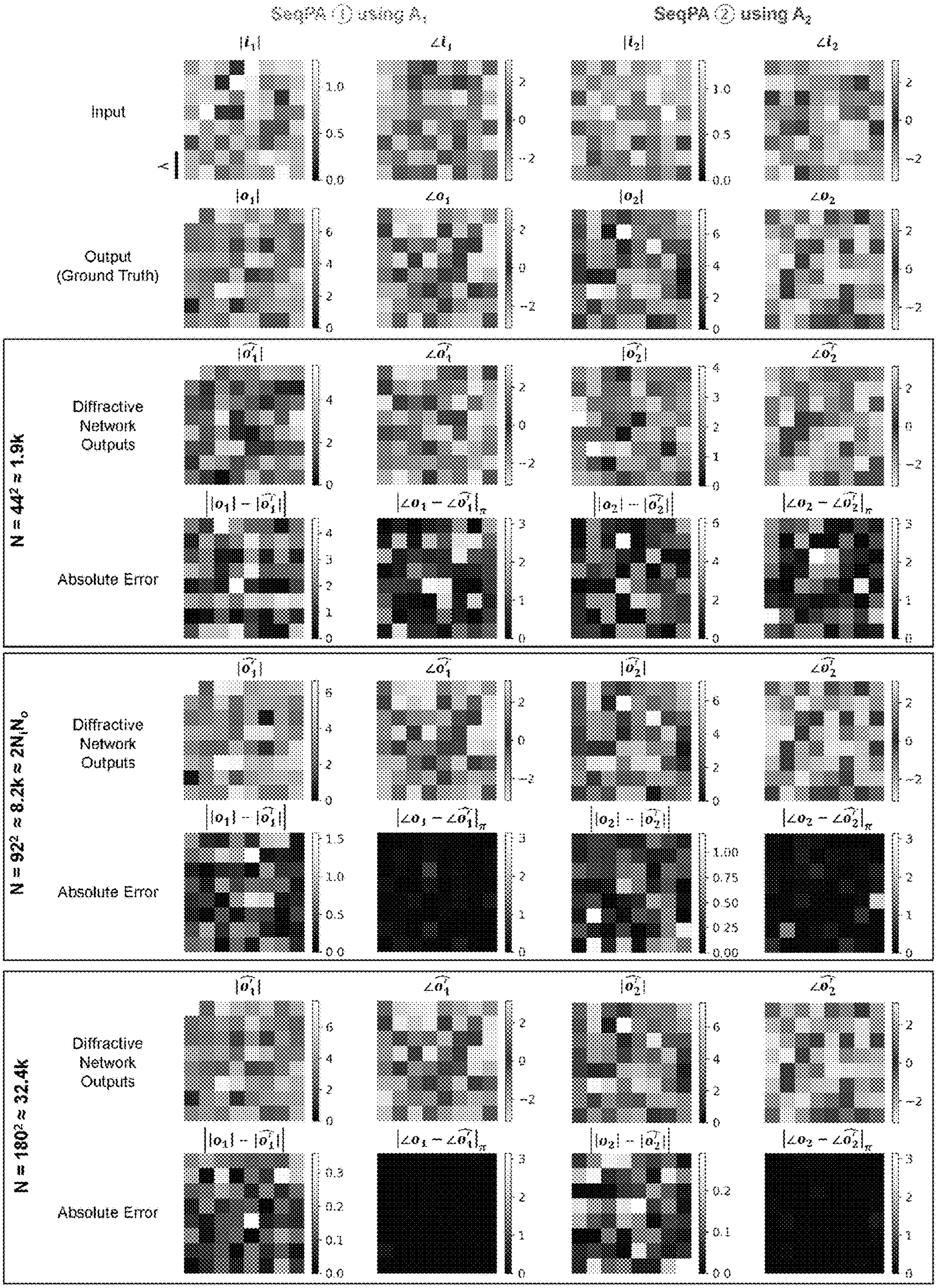
FIG. 4 illustrates examples of input/output complex fields for the ground truth transformations presented in FIGS. 2 and 3 along with the output fields computed by the 2-channel polarization multiplexed diffractive designs trained with the SeqPA mode using $N=44^2$, $92^2$ and $180^2$. Note that $|\angle o-\angle \hat{o}'|_\pi$ indicates the wrapped phase difference between the ground truth output field o and the normalized diffractive network output field $\hat{o}'$.
Figure 5A:
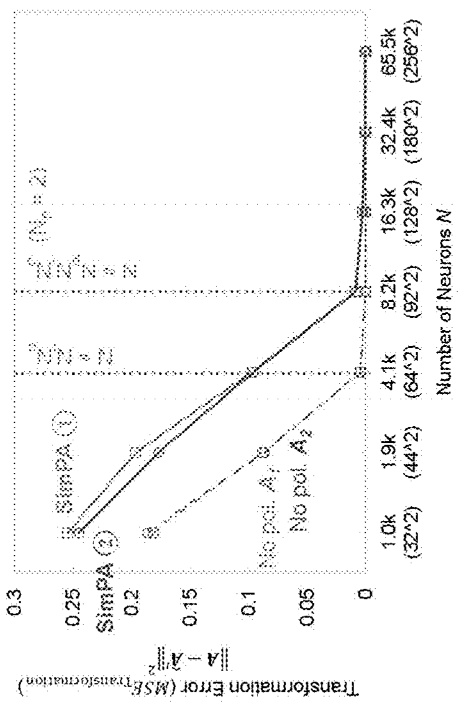
FIGS. 5A-5D illustrate the diffractive all-optical transformation results for 2-channel polarization multiplexing using the simultaneous polarization access (SimPA) mode.
Figure 5B:
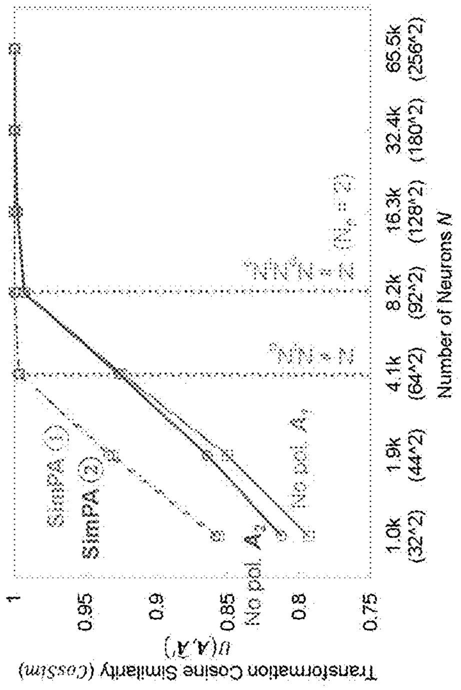
Figure 5C:
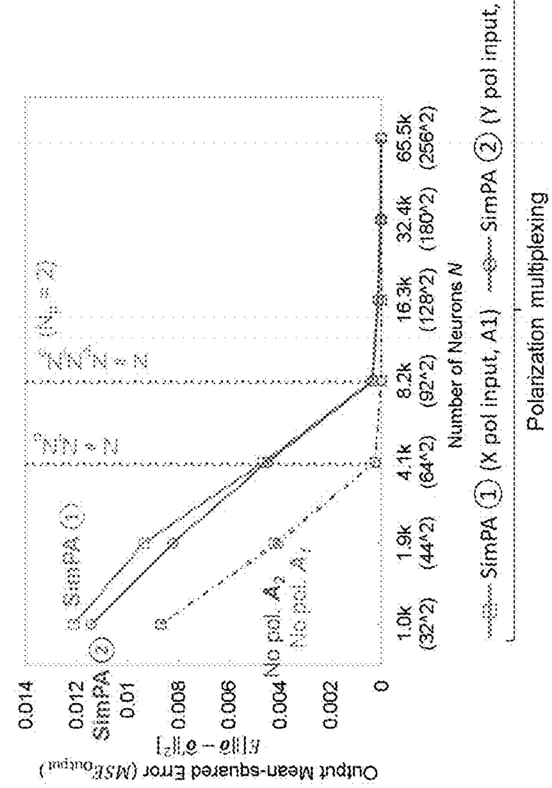
Figure 5D:
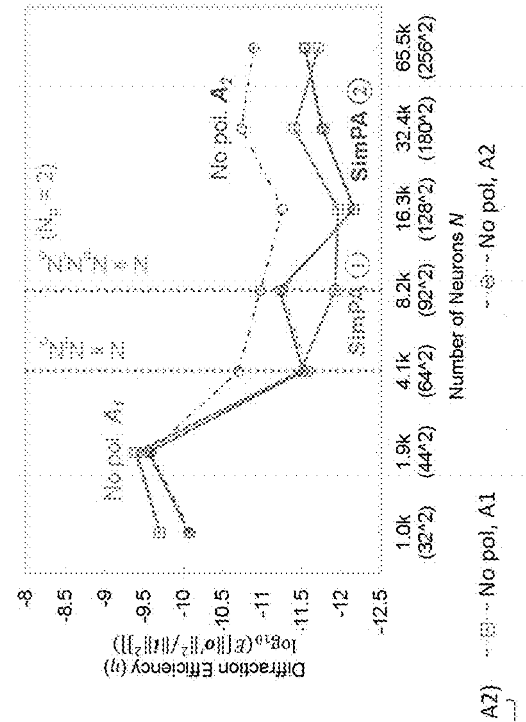

To further demonstrate the performance of the polarization-encoded diffractive networks 10, in FIG. 3 examples of the ground truth transformation matrices (i.e., $A_1$ and $A_2$) and their counterparts (i.e., $A'_1$ and $A'_2$)

resulting from the diffractive designs with $N=\{44^2, 92^2, 180^2\}$ are shown, along with the amplitude and phase absolute errors. Exemplary complex-valued input-output fields from the same set of diffractive designs are also presented in FIG. 4. FIGS. 3 and 4 reveal that for both of the polarization channels, when $N\geq N_pN_iN_o=2N_iN_o$, the all-optical transformation matrices and the output complex fields very well match their ground truth targets with negligible absolute errors, which are also in line with the observations made in FIG. 2.

2-Channel Polarization Multiplexed all-Optical Diffractive Computing Using the Simultaneous Polarization Access (SimPA) Mode As an alternative to the sequential polarization access (SeqPA) used earlier, the use of the simultaneous polarization access (SimPA) mode in the all-optical computing framework was explored. As shown in FIG. 1B, right, in single access to the diffractive system, the input complex-valued data $i_1$ and $i_2$ are fed into the polarization channels ① and ②, respectively, and the all-optical diffractive outputs $$o'_1 \text{ and } o'_2$$

are collected at the same time through two orthogonal polarization states at the output FOV. Before a new polarization multiplexed diffractive network was trained from scratch using the SimPA mode, the earlier diffractive designs trained using the SeqPA mode were obtained and tested them directly using the SimPA mode by inputting both polarization channels ① and ② at the same time, deviating from their training scheme, which only used SeqPA. The results of blindly testing the SeqPA-trained diffractive networks under the SimPA mode are shown in FIG. 9A-9D, which reveals inference results with significantly higher values of $MSE_{Transformation}$ and $MSE_{Output}$ and decreased values of CosSim, all of which indicate a performance degradation, when one operates a SeqPA-trained diffractive network using the SimPA mode. As shown in FIG. 10, this performance degradation is due to the "cross-talk" between the two transformation channels when both of the input polarization states are at the same time present, which was not considered during the SeqPA-based training process. These results highlight the necessity of training the diffractive system from scratch under the SimPA mode, so that the impact of this cross-talk can be taken into account and minimized during the iterative design process. A related mathematical analysis that supports the same conclusion is reported in the Supplementary Note 1 herein.

After training the digital diffractive models from scratch using the SimPA mode, their blind testing results are reported in FIG. 5 using the solid curves labeled with "SimPA ①" and "SimPA ②". The results of the new diffractive designs trained using the SimPA mode demonstrate the success of all-optically performing two different linear transformations in parallel using polarization multiplexing. Analysis (FIG. 5) also reveals the same conclusions discussed earlier for the models trained using the SeqPA mode: the all-optical transformation performance of polarization multiplexed diffractive networks very well match the ground truth, desired transformations as N approaches $N_pN_iN_o=2N_iN_o$. Furthermore, as shown in FIG. 5D, the diffraction efficiencies achieved by the polarization multiplexed diffractive networks reach a similar level as their baseline counterparts that use the same number of diffractive layers, but without the linear polarizer array.

The blind testing results of these two different modes of operation (SeqPA vs. SimPA) were compared and performed a cross-talk field analysis (see FIGS. 10A-10E). It was found that the amount of transformation cross-talk in the diffractive models trained using the SimPA mode (shown in the right column of FIG. 10C-10D), is ~300-fold lower when compared with the amplitude values of the cross-talk observed in the diffractive designs trained using the SeqPA mode (shown in the left column of FIG. 10C-10D). During the diffractive model training, these cross-talk fields are gradually eliminated (penalized) using the SimPA mode of operation to better approximate the ground truth fields. However, for the diffractive models trained under the SeqPA mode, such cross-talk fields are ignored (i.e., remain non-penalized during the training phase) since the SeqPA operation assumes successive access to the diffractive network, one input polarization state at a time. Stated differently. Seq-PA trained diffractive networks successfully approximate the target transformations only when they are tested under the same SeqPA mode of operation, and fail due to the field cross-talk when tested under the Sim-PA mode.

4-Channel Polarization Multiplexed All-Optical Diffractive Computing

Figure 6A:
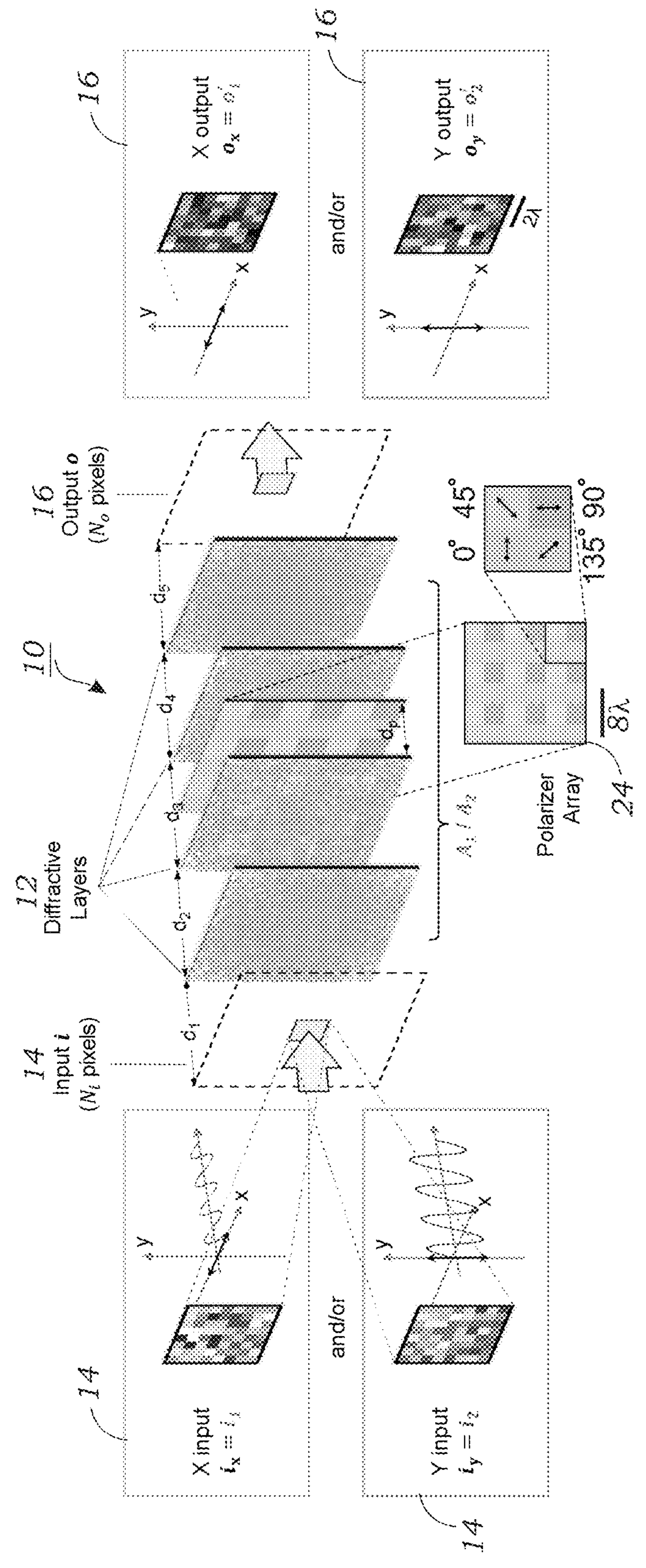
FIGS. 6A-6B is a schematic illustration of 4-channel polarization multiplexed all-optical diffractive computing framework for performing four unique linear transformations through a single diffractive network.
Figure 6B:
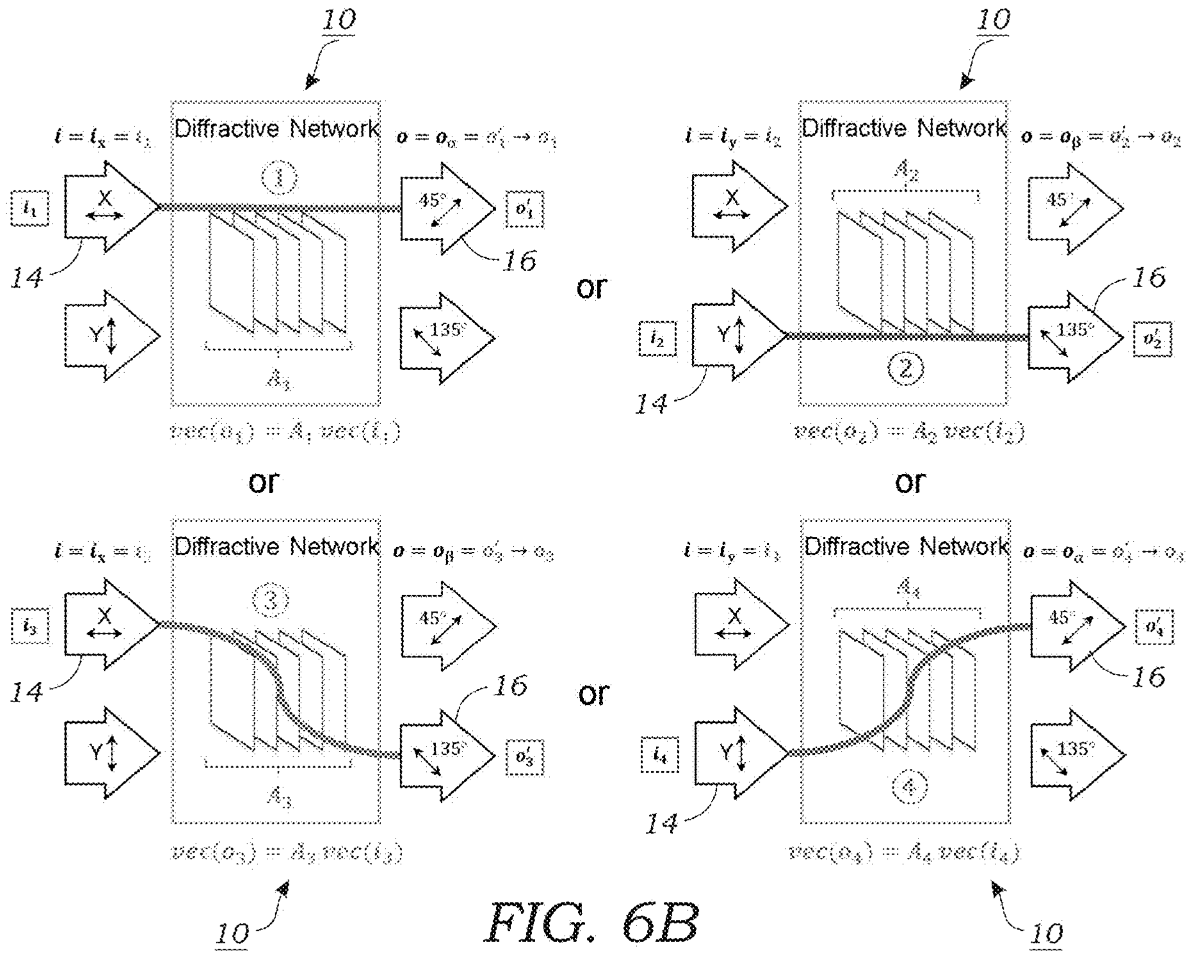

So far, all-optical computing with 2-channel polarization multiplexing through a single diffractive network 10 has been demonstrated. To further exploit the polarization multiplexing capability of this diffractive computing framework, next, a 4-channel polarization multiplexed design was explored for performing four (4) different arbitrarily-selected linear transformations through a single diffractive network (i.e., $N_p=4$). FIGS. 6A, 6B illustrates the schematics of this framework. As depicted in FIG. 6B, by sequentially connecting one of the two input polarization states with one of the two output polarization states, four transformation channels, ①, ②, ③ and ①, can be formed to all-optically perform $N_p=4$ distinct complex-valued transforms using the same diffractive processor. This 4-channel polarization multiplexed design operates in a similar way as the SeqPA mode, where the different input data are separately and sequentially fed into different input polarization channels. Using this SeqPA operation mode, the diffractive system can accurately perform 4 different complex-valued linear transformations using the same passive diffractive layers, in a single optical network. For example, when only one polarization state (e.g., $i_x$) is utilized to encode the input data (i.e., $i=i_x=i_1=i_3$), one can measure the output field at two orthogonal polarization states and simultaneously read out two computed outputs (i.e., $o_a=o_1$ and $o_\beta=o_3$), each corresponding to the result of a uniquely different linear transformation (i.e. $A_1$ or $A_3$) computed based on the same input; this capability enables parallel optical information processing through the same polarization encoded diffractive network. The overall design of this 4-channel diffractive system can be considered to utilize the remaining degrees of freedom in the crosstalk channels of the 2-channel system. Additional analysis that supports the same conclusions can be found in Supplementary Note 1.

Further, compared to the 2-channel polarization multiplexed system reported earlier, the polarization states for the output field sampling in this 4-channel system are selected to be 45° and 135° linear polarization. This design choice is made to balance out the diffraction efficiencies of the resulting four (4) different linear transformations that are all-optically performed by the diffractive network 10. Stated differently, this design choice introduces symmetry to all the input/output polarization combinations that are each assigned to a different linear transformation. In FIGS. 6A and 6B, two output fields corresponding to the linear polarization directions at 45° and 135° are denoted as $o_\alpha$ and $o_\beta$, respectively.

In the light of the earlier findings that point to the need for more diffractive neurons in the case of $N_p=2$ when compared to $N_p=1$, here eight (8) successive trainable diffractive layers were employed to increase the degrees of freedom for $N_p=4$ design (see FIG. 6A). Also, compared to the earlier 2-channel polarization multiplexed design, an additional linear polarizer array 24 was included with the same configuration as before (with polarization orientations of 0°, 45°, 90° and 135° to further enhance the spatial diversity of polarization modes within the diffractive processor. These two linear polarizer arrays are positioned after the $3^{rd}$ and $5^{th}$ diffractive layers, respectively. Same as the $N_p=2$ diffractive designs, these linear polarizer arrays 24 are pre-determined (i.e., non-trainable) and act as "polarization seeds" within the trained diffractive network 10.

Figure 7A:
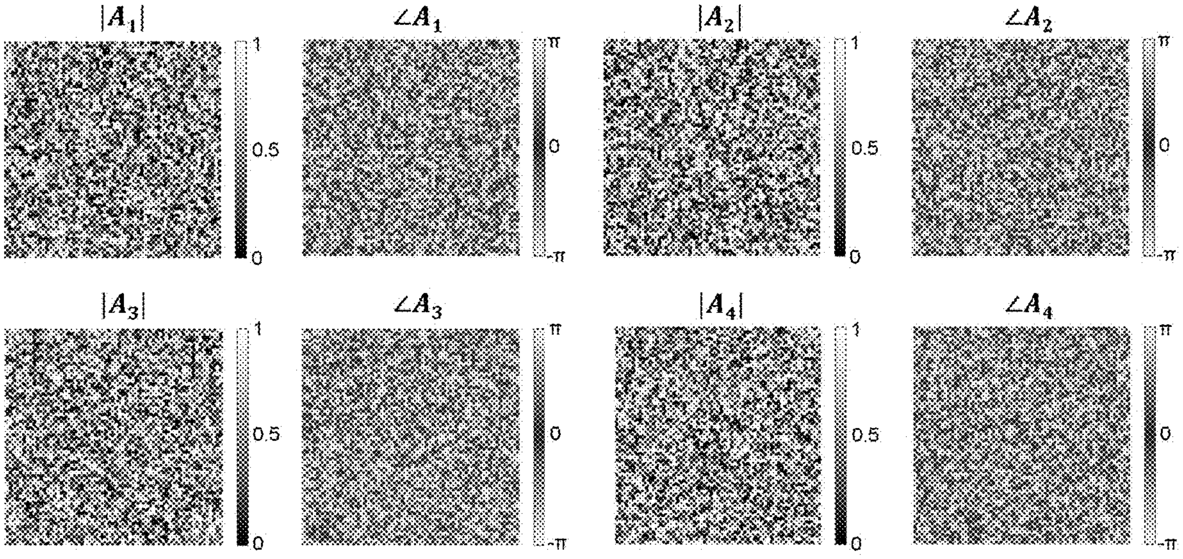
FIGS. 7A-7E illustrate the diffractive all-optical transformation results for 4-channel polarization multiplexing of four distinct arbitrary linear transforms (depicted in FIG. 6*b*).
Figure 7C:
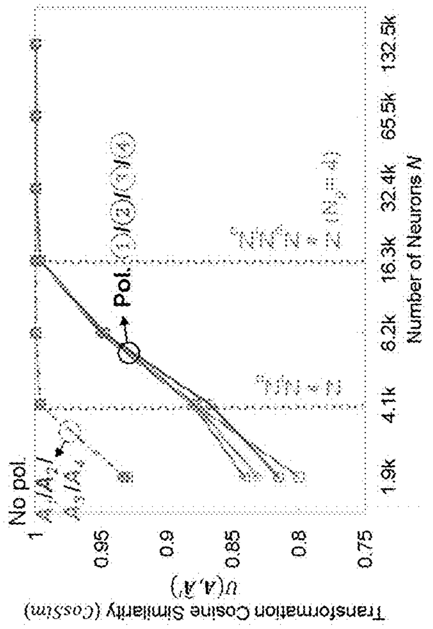
Figure 7B:
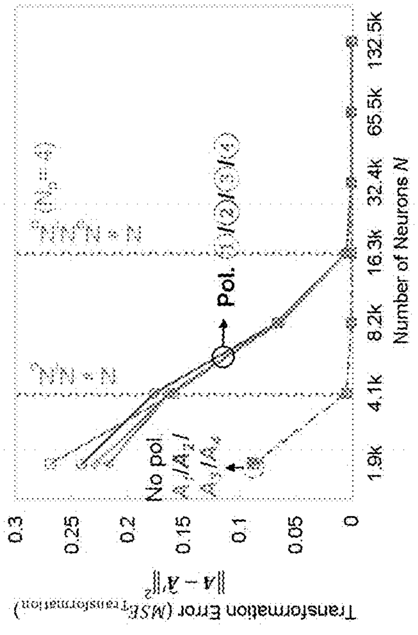
Figure 7E:
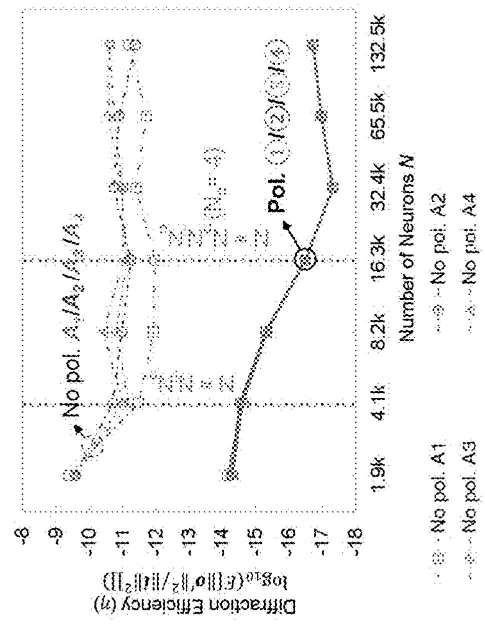
Figure 7D:
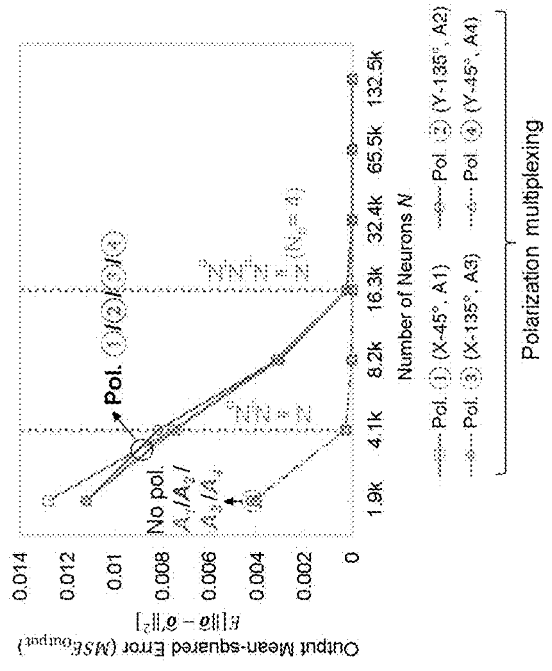

Next, random data was generated to train and test diffractive networks under $N_p=4$. In addition to the two randomly-generated ground truth transforms $A_1$ and $A_2$ that were earlier used for the 2-channel models, two additional complex-valued transforms $A_3$ and $A_4$ were randomly generated and accordingly constructed the training and testing dataset consisting of the input and ground truth output fields. These four (4) ground truth (target) transforms are visualized in FIG. 7A, and their differences can be found in FIG. 8. Following the training of the polarization multiplexed diffractive networks with different N, their transformation performance for $N_p=4$ is analyzed in FIGS. 7B-7D based on the same set of performance metrics that were used earlier. These results reveal that, when N approaches $N_pN_iN_o=4N_iN_o=16.4$ k, the $MSE_{Transformation}$ and $MSE_{Output}$ of all the four diffractive transformations approach 0, while the CosSim approaches 1, demonstrating that all the target linear transformations ($A_1$, $A_2$, $A_3$ and $A_4$) can be successfully approximated by a single diffractive processor with a negligible error if $N \geq N_pN_iN_o$. This is the same conclusion that was reached earlier for $N_p=2$.

Figure 11:
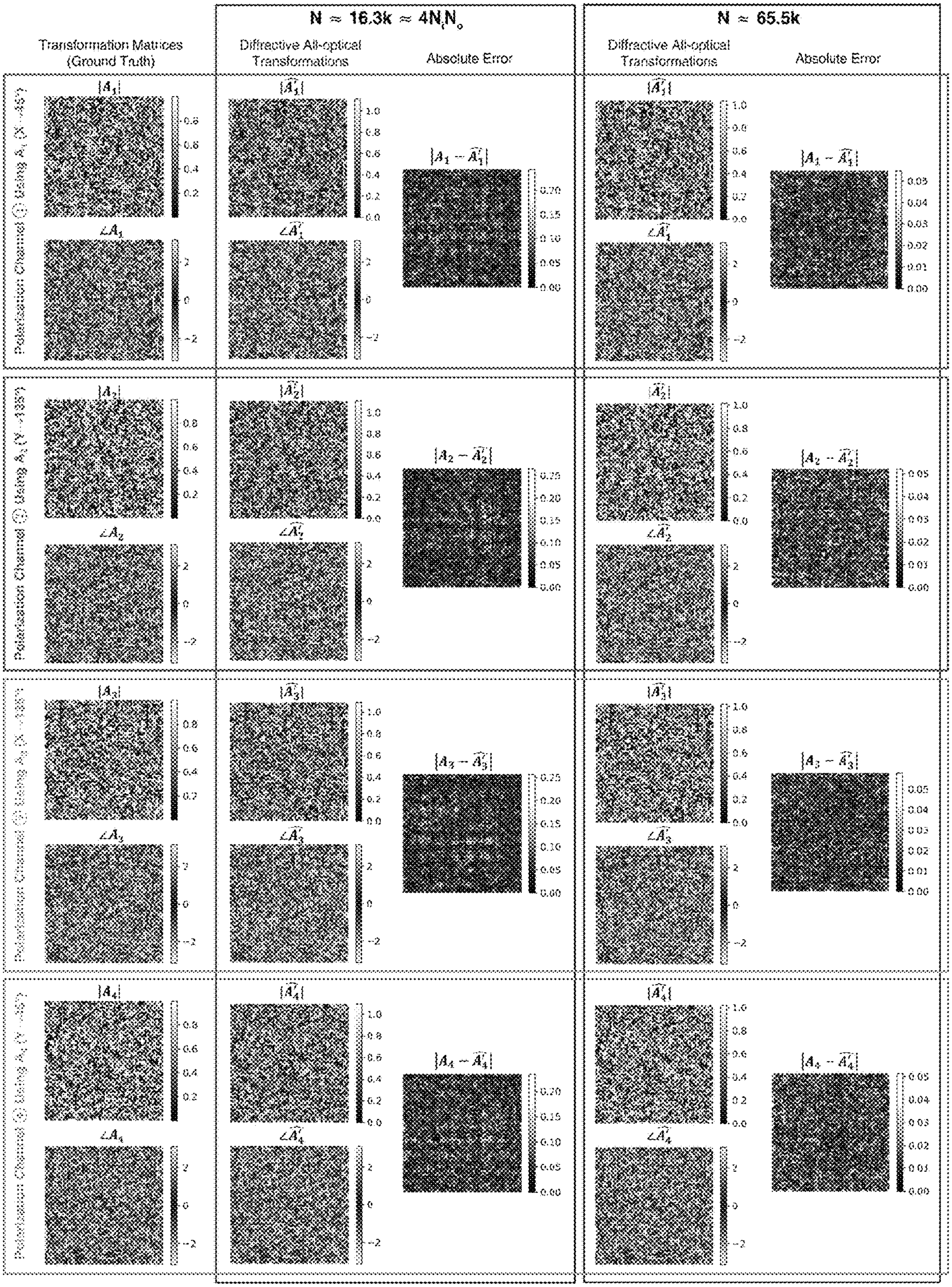
FIG. 11: All-optical transformation matrices estimated by the 4-channel polarization multiplexed diffractive designs with N=16.3 k and 65.5k and their differences from the ground truth matrices.
Figure 12:
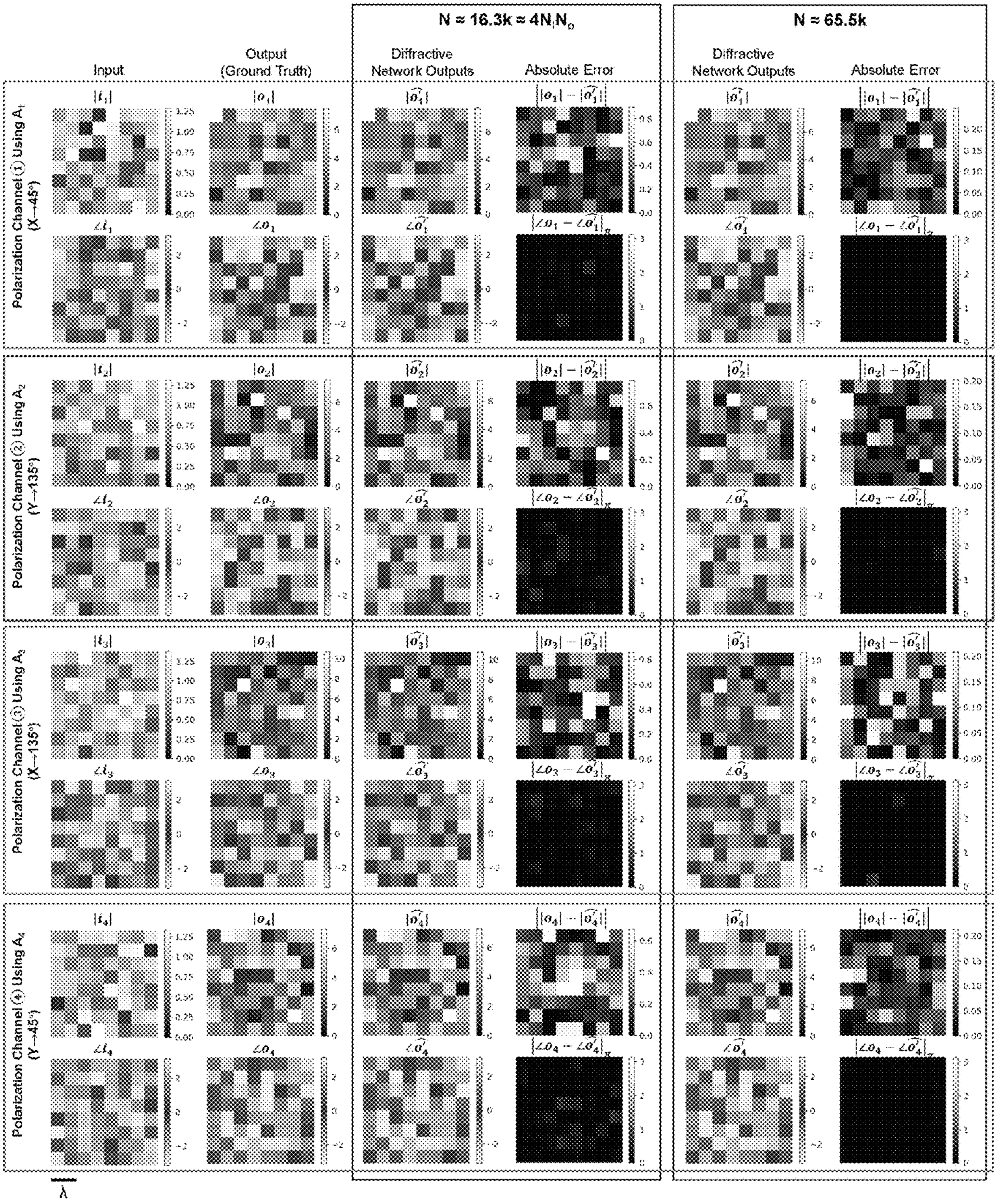
FIG. 12: Examples of input/output complex fields for the ground truth transformations presented in FIGS. 7 and 11 along with the output fields computed by the 4-channel polarization multiplexed diffractive designs using N=16.3 k and 65.5 k. Note that $|\angle o - \angle \hat{o}'|_{\pi}$ indicates the wrapped phase difference between the ground truth output field o and the normalized diffractive network output field $\hat{o}'$.

To further demonstrate the success of these 4-channel polarization-multiplexed diffractive systems, in FIG. 11 the ground truth transformation matrices are presented (i.e., $A_1$, $A_2$, $A_3$ and $A_4$) and their diffractive counterparts (i.e., $A'_1$, $A'_2$, $A'_3$ and $A'_4$)

designed with N={14.3k, 66.5 k}, along with the amplitude and phase errors made in each case. Furthermore, exemplary complex-valued output fields achieved by these diffractive systems are also shown in FIG. 12, all of which confirm the success of the presented 4-channel polarization-multiplexed diffractive designs. Finally, the output diffraction efficiencies of these diffractive models were analyzed and reported in FIG. 7E. The results show that, compared to their counterparts without polarization encoding ($N_p=1$), the polarization multiplexed diffractive models with $N_p=4$ turn out to be less power efficient (per transformation), with an efficiency decrease of ~6 dB at the output FOV.

This relatively small difference in the output diffraction efficiencies mainly stems from the different number of diffractive layers used in these two systems: the baseline diffractive systems without polarization encoding use 4 diffractive layers, whereas the 4-channel polarization multiplexed systems are much deeper, utilizing 8 diffractive layers. Considering that the optical field within a deeper system with more diffractive layers propagates and spreads over a longer axial distance, it exhibits a relatively lower diffraction efficiency. Therefore, these results do not contradict the previous conclusion that the diffraction efficiency of the polarization multiplexed diffractive network is similar to that of the baseline diffractive system when using the same number of diffractive layers.

The results and analyses presented so far demonstrated that a single polarization-multiplexed diffractive network can all-optically compute four different complex-valued, arbitrarily-selected linear transformations between its input and output FOVs by using orthogonal linear polarization states. In addition to linear polarization, other polarization states can also be used, without loss of generality, to perform the same multiplexed computational tasks. To demonstrate this capability, two orthogonal circular polarization states were used (i.e., left- and right-band circular polarization) at the input of a polarization-multiplexed diffractive network to encode the input information: the output channels in this case included x and y linear polarization states, i.e., the 4 different, arbitrarily-selected linear transformations were each assigned to one combination of circular-linear polarization. The results, reported in FIGS. 22A-22D, revealed that circular input polarization-multiplexed diffractive processors successfully approximated the target, complex-valued linear transformations, when N approaches $N_pN_iN_o=4N_iN_o=16.4$ k, arriving at the same conclusion made for linear input polarization states.

In this diffractive design, the same linear polarizer array (i.e., the seed) was used within the diffractive network volume to communicate between the circular polarization states at the input FOV and the linear polarization states at the output FOV, all-optically performing 4 different complex-valued transformations through the same diffractive network. A mathematical analysis of this design and its relationship to earlier diffractive designs with linear input/output polarization states is also provided in Supplementary Note 1. Since any arbitrary polarization state can be expressed through a superposition of orthogonal linear or circular polarization states, the same diffractive design can be extended to different input/output combinations of other polarization states. As detailed in Supplementary Note 1, a polarization multiplexed diffractive processor with $N_p=4$ can be designed by using input-output combinations of 2 orthogonal input polarization states (e.g., linear, circular or elliptical) and 2 orthogonal output polarization states (e.g., linear, circular or elliptical), where each input-output polarization combination all-optically performs one of the target complex-valued transformations ($A_1$, $A_2$, $A_3$, $A_4$). Supplementary Note 1 further proves that any additional transformation matrix $A_\alpha$ that can be assigned to a new combination of input-output polarization states of the diffractive network can be written as a linear combination of $A_1$, $A_2$, $A_3$, $A_4$.

Discussion

The results and analysis demonstrate that, using polarization multiplexing in a single diffractive network 10, one can all-optically perform a group of complex-valued arbitrary linear transformations at the same output FOV of the diffractive network 10. In practical applications, these different transformations can cover, for example, various machine vision tasks, such as detection, classification, and localization of objects, which can be programmed into different input/output polarization states. These different tasks could potentially be also performed by employing multiple, separately-optimized diffractive networks, each of which is dedicated to performing a single computational task. However, such an approach would require the precise optical projection of an input FOV (while preserving its phase and amplitude distribution and polarization information) onto separately positioned, individual diffractive networks, and would naturally suffer from additional optical losses and aberrations, misalignment issues, a much larger device footprint and higher manufacturing/alignment-related costs. In contrast, integrating multiple tasks to be all-optically performed within the same diffractive network and a common input FOV provides a much simpler and better design, offering unique advantages such as e.g., speed, compactness, resilience to misalignments and aberrations, power efficiency and cost-effectiveness.

Also note that, it is not practical to spatially superimpose multiple diffractive subsystems, each one separately designed for a unique transformation, using e.g., phase-composite metasurfaces or other metamaterials to create a polarization-multiplexed diffractive processor. First, in the design of each diffractive meta-unit, the cross-talk between the meta-atoms for the two orthogonal polarization states cannot be neglected. Therefore, the direct superposition of two or more different metasurface designs separately trained/designed for each one of the complex transformations would not work due to the cross-talk between the polarization channels of different metasurface designs. Stated differently, different metasurface designs, when put together in order to achieve multiplexed linear transformations in the same optical unit, will fail each other's transformation accuracy. In addition to this, there will be field cross-talk between the adjacent meta-units that are merged together on the same layer due to the in-plane propagating waves. Although increasing the lateral distance between two adjacent meta-units (from different designs, each targeting one transformation) can weaken the impact of this field cross-talk problem, it will then lead to lower diffraction efficiencies at the output and sacrifice the lateral density of the meta-units at each diffractive layer, thus degrading the computational performance and accuracy of the system. Furthermore, the desired phase response of such polarization encoded meta-units in general covers a small angular range, leading to a low numerical aperture (NA) that fundamentally limits the connectivity between the diffractive layers. In the diffractive solutions discussed herein, each isotropic feature of the diffractive network communicates with the following diffractive layer(s) with an NA of n (n=1 in air). However, metasurface-based designs would fall short to offer such high numerical apertures, because the high spatial frequency components for the orthogonal input polarizations would deviate from the ideal phase response of the meta-unit, introducing errors to the multiplexed linear transformations that are targeted. Due to some of these challenges outlined above, metasurface or metamaterial-based diffractive surfaces have not yet been demonstrated as a solution to universal, all-optical implementation of an arbitrary linear transformation or a group of transformations.

In addition to polarization multiplexing, it should be noted that other degrees of freedom can be used to implement multiple computational tasks through a single diffractive network 10. For example, one can divide the input/output FOVs of the diffractive network 10) into multiple regions, where each region is assigned to a unique computing task through spatial-division multiplexing. It is also possible to achieve wavelength-division multiplexing by assigning different wavelengths or spectral bands to independent computing tasks and employing dispersive elements in the diffractive computing system. In contrast to these other possible methods of information multiplexing, the polarization-based multiplexing that are reported here requires solely the addition of polarizers to a diffractive network without changing its architecture. Such polarizers are readily available (e.g., polarizing films), even integrated with the individual pixels of polarization-based imaging systems, and can be adapted to a wide range of wavelengths. The polarizers or polarizer arrays 24 may be located on, within, or adjacent to the surface of the one or more optically transmissive and/or reflective substrate layer(s) 12. The polarizer arrays 24 may be physically integrated on or within the one or more optically transmissive and/or reflective substrate layer(s) 12. In addition, the polarizer arrays 24 may have individual polarizer elements with orientations and locations that are fixed (as used herein) or controllable/programmable/reconfigurable. Furthermore, polarization multiplexing can be flexibly coupled with other multiplexing methods (such as spectral and/or spatial multiplexing) to further increase the computing capacity of the diffractive network.

Unlike the substrate layers 12, where the transmission properties/coefficients are trained and optimized to all-optically perform the target transformations, the design and arrangement of the seed polarizer arrays 24 between the substrate layers 12 are treated as hyperparameters that are pre-determined and non-trainable. Therefore, the parameters of the embedded polarizers including their number, size, and orientation are fixed during the training process. The polarization modulation induced by these polarizer arrays remains unchanged and was not used as learnable degrees of freedom for the diffractive computing system to approximate the target transformations. Furthermore, their total number is small. i.e., 6×6=36 linear polarizers per array were used, which is negligible when compared to N. An increase in the number of linear polarizers per plane would not improve the approximation power of the diffractive network to perform arbitrary linear transformations. However, the topology of such polarizer seeds could potentially impact the performance of the polarization multiplexed diffractive computing system. To explore this, several key parameters of the linear polarizer array used in the diffractive processor designs was adjusted including e.g., 1) the period of each polarizer unit, 2) the overall size of each polarizer array, and 3) the number and position of the polarizer arrays within the diffractive network. For this comparative analysis, the 4-channel polarization multiplexed diffractive system was used as the test-bed with $N=N_pN_iN_o=16.3$ k and the same complex-valued target linear transforms (i.e., $A_1$, $A_2$, $A_3$ and $A_4$), the results of which are summarized in Supplementary Note 2. Based on these analyses, it was observed that: (1) a better approximation accuracy can be achieved when the period of each linear polarization unit on the polarizer array is ≤4λ, and a period of ~4λ empirically appears as an optimal choice, also providing an improved output diffraction efficiency (see FIGS. 23A-23C): (2) the linear transformation accuracy and the diffraction efficiency of the system can be optimized by using polarizer arrays with a sufficiently large size. i.e., at least matching the size of the neighboring diffractive layers: (3) using two polarizer arrays and placing them apart with an axial distance of ~8λ within the diffractive volume can provide improved results for the all-optical transformation accuracy and diffraction efficiency of $N_p=4$ designs; and (4) using too many (e.g., >6) polarizer arrays within a diffractive network can lead to severe degradation in the computational accuracy of the system (unless more diffractive layers are added to the design).

It should also be emphasized that the reported polarization-multiplexed diffractive networks can be directly applied to 2D arrays of phase and amplitude input data. Compared to other optical computing systems operating based on e.g., integrated photonics, which requires 1D inputs and phase recovery if the information is represented in the phase channel, the capability to directly process and analyze raw 2D complex fields makes the framework highly advantageous for visual computing tasks. On the other hand, unless spatial light modulators (SLMs) are employed as part of the diffractive system, each physically fabricated diffractive network 10 is fixed and would need to be retrained and fabricated again as the target transformations change, which is a limitation of passive diffractive systems.

Figures 13A, 13B, 13C, 13D:
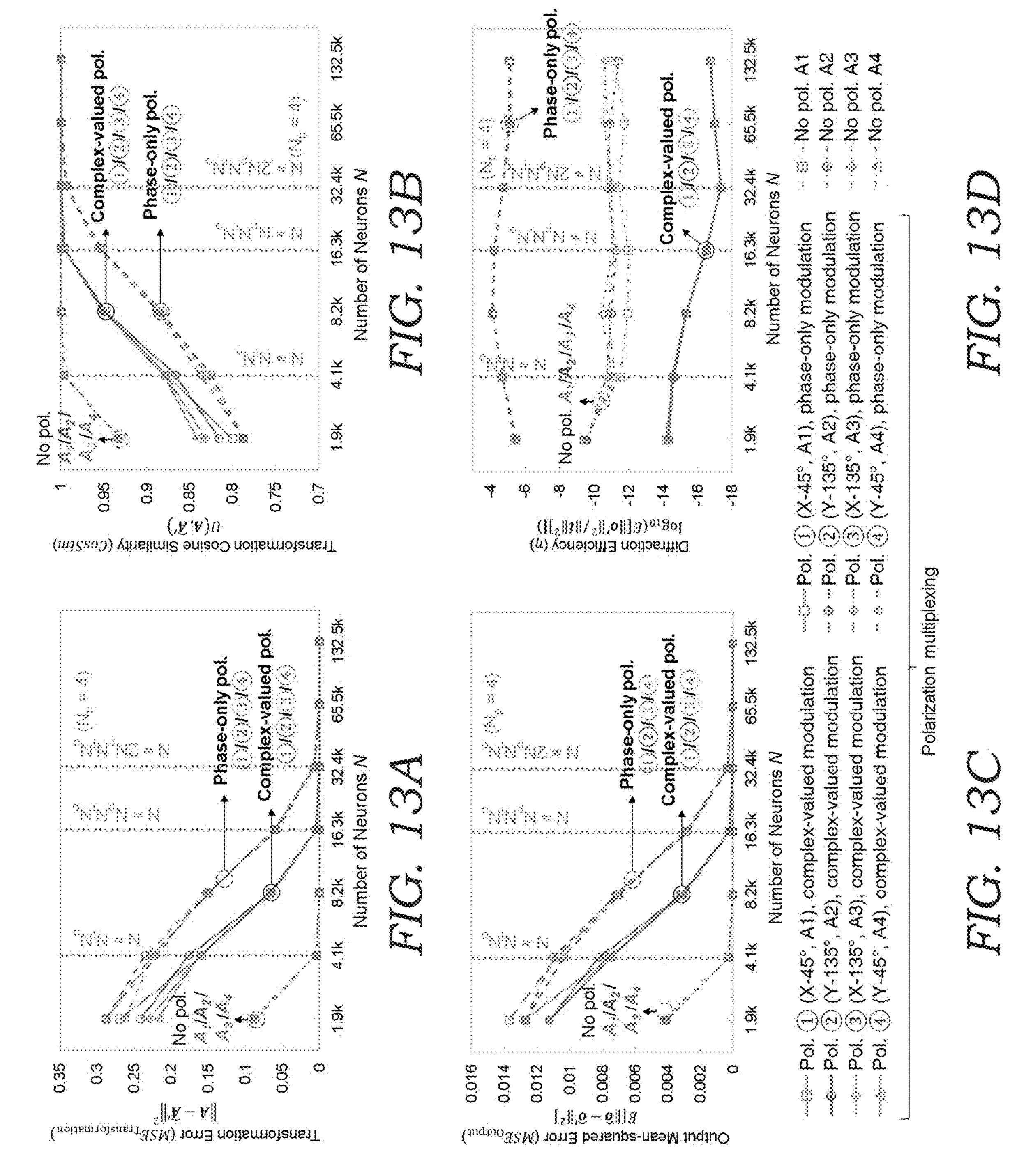
FIGS. 13A-13D: Diffractive all-optical transformation results for 4-channel polarization multiplexing of four distinct arbitrary linear transforms (depicted in FIG. 6) using phase-only diffractive networks.
Figure 14A:
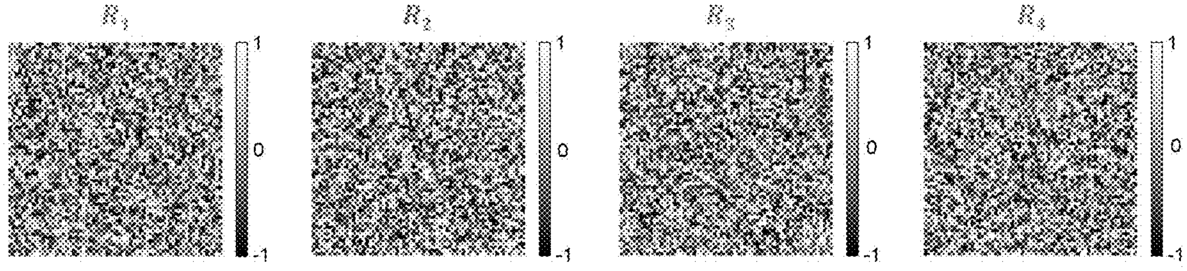
FIGS. 14A-14E: Diffractive all-optical transformation results for 4-channel polarization multiplexing of four distinct arbitrarily-selected real-valued linear transforms using phase-only diffractive networks.
Figure 14B:
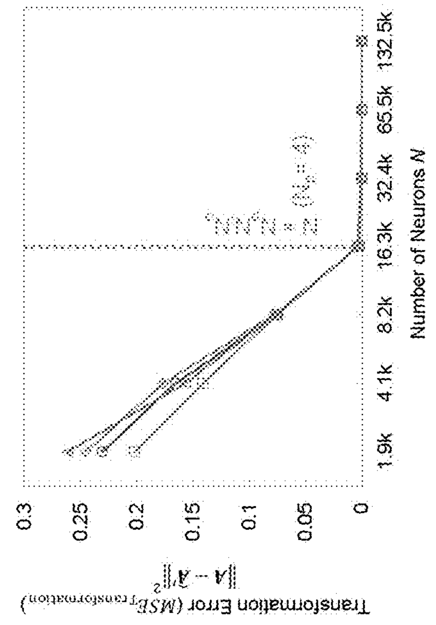
Figure 14C:
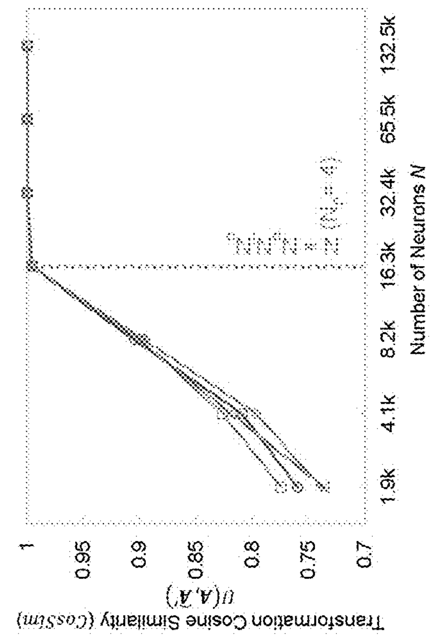
Figure 14D:
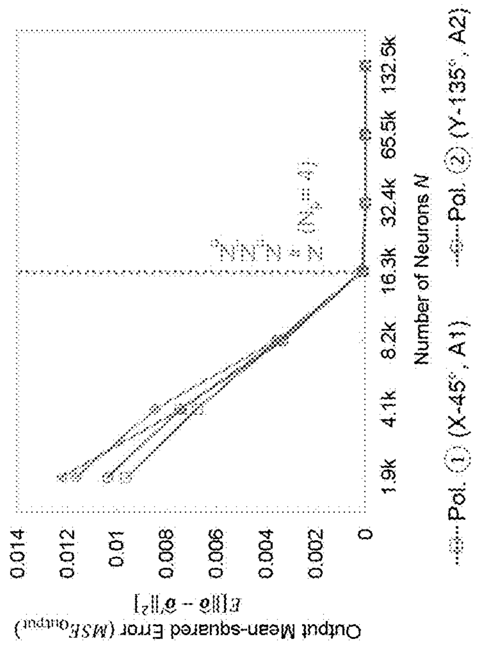
Figure 14E:
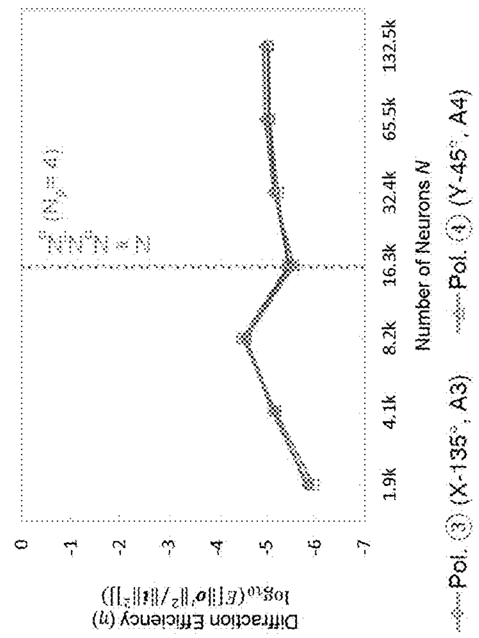

There are additional limitations of the presented diffractive computing framework. First, polarization multiplexed diffractive computing systems present lower diffraction efficiencies at their output FOV compared to regular diffractive networks without polarization multiplexing. (See FIGS. 2E and 5D). Several remedies can be used to improve the output diffraction efficiency such as e.g., adding a diffraction-efficiency-related penalty term to the training loss function, and/or restricting the diffractive layers to perform phase-only modulation. The efficacy of using these approaches in a regular diffractive network design (without polarization multiplexing) to improve the output diffraction efficiency has already been demonstrated. To exemplify the performance of a phase-only diffractive design and how it can be used to improve the output diffraction efficiency, phase-only diffractive networks were trained from scratch for the 4-channel polarization multiplexing case ($N_p=4$), the results of which are summarized in FIGS. 13A-13D. This analysis revealed that phase-only diffractive designs can achieve significantly better output diffraction efficiencies (FIG. 13D) (improved on average by ~12 dB), while still successfully approximating the target linear transformations ($A_1$, $A_2$, $A_3$ and $A_4$). As a trade-off, however, these phase-only diffractive designs also exhibit reduced degrees of freedom compared to their complex-valued counterparts. As a result of this, it was observed that all the target linear transformations were successfully approximated by a single phase-only diffractive processor when N approached $2N_pN_iN_o=8N_iN_o$. This 2-fold "threshold increase" in the number of diffractive features (i.e., $2N_pN_iN_o$ vs. $N_pN_iN_o$) is a direct reflection of the reduced number of trainable transmission parameters per diffractive layer due to the phase-only operation, which is a limitation of phase-only diffractive networks, despite their enhanced output diffraction efficiency. To further validate this conclusion, another set of four (4) target linear transformations were selected by changing the matrix elements to be real-valued, and used them as ground truth to train phase-only polarization multiplexed diffractive networks with $N_p=4$. As shown in FIGS. 14A-14E, the results reveal that these phase-only diffractive networks can successfully approximate the real-valued target linear transforms when $N \geq N_pN_iN_o=4N_iN_o$, demonstrating a similar approximation performance, with significantly higher output diffraction efficiency compared to their complex-valued diffractive counterparts. These findings emphasize the value of phase-only diffractive network designs as a photon-efficient solution in polarization multiplexed diffractive computing, also providing an important rationale for planning the diffractive neuron budget (N) for a given computational task.

Other practical concerns that need to be discussed include the potential fabrication and alignment errors, surface reflections, material absorption and non-ideal polarization modulation within the diffractive network, which may altogether limit the performance and accuracy of diffractive computing. Some of these errors can be mitigated by selecting appropriate fabrication methods, e.g., high-precision lithography, and using less absorptive materials. Moreover, previous results showed that some of these uncontrolled physical errors and imperfections did not lead to a significant discrepancy between the experimental and numerical, expected results, indicating the correctness of the assumptions involved in the optical forward model and training procedures. Even if these errors and imperfections become considerable, the performance degradation of a diffractive network caused by some of these experimental factors can be compensated by incorporating them as random variables into the physical forward model of the diffractive network during the training process. One example of this has been demonstrated previously where the destructive impact of the lateral and axial misalignments of diffractive layers was mitigated by randomly misaligning the diffractive network during its training process. Following a similar strategy, the imperfect polarization extinction ratio (PER) of the polarizer arrays/seeds can also be included as part of the physical forward model using a modified form of the Jones matrices for linear polarizers. This modeling of imperfect PER of linear polarizers during the training phase can mitigate a potential performance degradation in the computational power of a polarization multiplexed diffractive processor. Supporting this conclusion, Supplementary Note 3 and FIGS. 24A-24D report the mathematical analysis and simulation results for using imperfect linear polarizer arrays/seeds in the diffractive network designs. In the same Supplementary Note 3, the overall PER of SimPA-based polarization multiplexed diffractive designs was quantified, considering each diffractive network as a monolithic polarization optical element. The analysis reveals that the SimPA-based 2-channel polarization multiplexed diffractive design exhibits a very high PER of >51,000. In fact, such a high PER is expected since the SimPA mode is designed to simultaneously perform two different linear transformations using two orthogonal polarization states, and therefore undesired polarization cross-talk at the output field-of-view was penalized during the training phase, successfully leading to a high PER diffractive network. For the SeqPA mode of operation, however, PER is not a meaningful figure-of-merit since only one orthogonal polarization state is read/measured at a given time due to the sequential access of each target transformation through the diffractive network: stated differently, the SeqPA mode of operation does not penalize the leakage of power into an orthogonal polarization state at the output as it does not impact at all the accuracy of each all-optical transformation that is sequentially performed.

In addition to performing multiple arbitrarily-selected linear transformations through polarization encoding, the presented framework can also be used for polarization-aware optical imaging and sensing tasks. Polarization-based optical imaging has been used in many biomedical applications, such as performing diagnoses of diseases, including gout, malaria infection, squamous cell carcinoma, and cerebral amyloid. The presented polarization-multiplexed diffractive computing framework exhibits translational potential for some of these biomedical applications including e.g., the all-optical detection and classification of birefringent crystals in bodily fluids for diagnosing various forms of crystal arthropathy.

A diffractive network-based all-optical computing framework is disclosed that can perform multiple complex-valued, arbitrary linear transformations using polarization multiplexing. This framework is very compact: for instance, the system depicted in FIGS. 1A-1B has a total length of only 20% in depth, where λ is the illumination wavelength. The results show that when the number of diffraction elements/neurons, N, in a given diffractive network design approaches $N_pN_iN_o$, a group of $N_p$ arbitrarily-selected linear transforms can be all-optically computed at the output FOV of the network with negligible error. This polarization multiplexed diffractive computing framework can be used to build all-optical, passive processors that can execute multiple inference tasks in parallel. Artificially engineered materials with polarization manipulation capabilities can also be combined with advanced diffractive surface fabrication techniques (e.g., high-precision 3D additive manufacturing and photolithography) to allow the use of the diffractive computing framework in different parts of the electromagnetic spectrum.

Materials and Methods

Forward model of the polarization multiplexed diffractive optical network. Using Jones calculus, the complex-valued, polarization-multiplexed electrical field E at a spatial location ($x_m$, $y_m$, $z_m$) can be represented as:

$$E(x_m, y_m, z_m) = \begin{bmatrix} E_x(x_m, y_m, z_m) \\ E_y(x_m, y_m, z_m) \end{bmatrix}. \quad (1)$$

In the implementation, $E_x$ and $E_y$ are computed in parallel throughout the entire diffractive system. Since the trainable diffractive layers (i.e., substrate layers 12) are not polarization-sensitive, the complex-valued modulation generated by these thin diffractive layers is the same for the two orthogonal polarization states. The diffractive layers are assumed to be thin optical modulation elements, where the $m^{th}$ feature on the $k^{th}$ diffractive layer at location ($x_m$, $y_m$, $z_m$) represents a complex-valued transmission coefficient, $t^k$, given by:

$$t^k(x_m, y_m, z_m) = a^k(x_m, y_m, z_m)\exp\left(j\phi^k(x_m, y_m, z_m)\right). \quad (2)$$

In Eq. 2, α and φ denote the amplitude and phase coefficients, respectively. The amplitude and phase coefficients of the diffractive neurons, $\alpha^k$ and $\varphi^k$ (k∈{1, 2, . . . , K}), are both trainable, with a permitted range of 0 to 1 and 0 to 2π, respectively. Before the training starts, $\alpha^k$ and $\varphi^k$ are randomly initialized with a uniform (U) distribution of U[0, 1] and U[0, 2π), respectively. For a phase-only diffractive design $\alpha^k$=1. The size of each diffractive neuron on the transmissive layers and the width of the pixels of the input/output fields are both chosen as λ/2.

The diffractive layers are connected to each other by free-space wave propagation, which is modeled through the Rayleigh-Sommerfeld diffraction equation:

$$w_m^k(x, y, z) = \frac{z - z_i}{r^2}\left(\frac{1}{2\pi r} + \frac{1}{j\lambda}\right)\exp\left(\frac{j2\pi r}{\lambda}\right), \quad (3)$$

where $$w_m^k(x, y, z, \lambda)$$

is the complex-valued field on the $m^{th}$ neuron of the $k^{th}$ layer at (x, y, z) with a wavelength of λ, which can be viewed as a secondary wave generated from the source at ($x_m$, $y_m$, $z_m$); and $r=\sqrt{(x-x_m)^2+(y-y_m)^2+(z-z_m)^2}$ and $j=\sqrt{-1}$. For the $k^{th}$ layer (k≥1, treating the input plane as the $0^{th}$ layer), the modulated optical field $$E_p^k$$

at location ($x_m$, $y_m$, $z_m$) with a polarization state of p (p∈{x, y}) is given by:

$$E_p^k(x_m, y_m, z_m) = t^k(x_m, y_m, z_m)\cdot\sum_{n\in S} E_p^{k-1}(x_n, y_n, z_n)\cdot w_m^{k-1}(x_m, y_m, z_m), \quad (4)$$

where S denotes all the pixels on the previous diffractive layer. For all the diffractive networks trained in this paper, the axial distances $d_0$, $d_1$, . . . , $d_K$ are all chosen as 4%.

When modeling the polarizer elements in the diffractive system, Jones matrices were used to represent the modulation of the complex field brought by the input polarizer, output analyzer, or the polarizer array at location (x, y, z), the process of which can be written as:

$$E_{out}(x, y, z) = J_{linear}(x, y, z)E_{in}(x, y, z), \quad (5)$$

where $E_{in}$ and $E_{out}$ are the vectors denoting the input and output complex field before and after the polarization modulation, each containing two orthogonal components along the x and y directions, i.e., $$E_{out}(x, y, z) = \begin{bmatrix} E_{out,x}(x, y, z) \\ E_{out,y}(x, y, z) \end{bmatrix} \text{ and } E_{in}(x, y, z) = \begin{bmatrix} E_{in,x}(x, y, z) \\ E_{in,y}(x, y, z) \end{bmatrix}.$$

$J_{linear}$(x, y, z) represents the Jones matrix of a linear polarizer element, which is given by:

$$J_{linear}(x, y, z) = \begin{bmatrix} \cos^2\theta(x, y, z) & \cos\theta(x, y, z)\sin\theta(x, y, z) \\ \sin\theta(x, y, z)\cos\theta(x, y, z) & \sin^2\theta(x, y, z) \end{bmatrix}, \quad (6)$$

where θ (x, y, z) is the angle between the x-axis and the polarizing axis of the linear polarizer located at (x, y, z). For the non-trainable, pre-determined polarizer array 24 that is composed of multiple square-shaped linear polarizers and, in total, four (4) types of linear polarizer units were used with four (4) different polarizing axis directions, θ={0, 0.25π, 0.5π, and 0.75π}. As illustrated in FIG. 1A, these four (4) different types of linear polarizers are spatially binned to have a 2×2 period and repeated with three periods in each direction, extending into a square region. The side length of each linear polarizer array 24 is 24λ. The residual space surrounding the polarizer array 24 is filled with air, without any polarization modulation. For all the diffractive network designs presented herein, the axial distances (i.e., $d_p$, $d_{p1}$ and $d_{p2}$) between the pre-determined polarizer arrays 24 and the adjacent substrate layer 12 in front of them are all empirically chosen as 0; stated differently, each linear polarizer array 24 is attached to the isotropic diffractive layer in front of it.

Preparation of the linear transformation datasets. In the diffractive network designs, the input and output FOVs have the same size of 8×8 pixels, i.e., ($i_c$, $o_c$∈ $\mathbb{C}^{8\times8}$(c∈{1, 2, 3, 4}). The size of the transformation matrices is equal to 64×64, i.e., $A_c$∈ $\mathbb{C}^{64\times64}$ (c∈{1, 2, 3, 4}). The amplitude and phase components of the complex-valued transformation matrices $A_c$ used in this paper were generated with a uniform (U) distribution of U[0, 1] and U[0, 2π), respectively, using the pseudo-random number generation function random.u-niform( ) built-in NumPy. Different random seeds were used to generate these transformation matrices to ensure they were uniquely different (see FIG. 8). Next, the amplitude and phase components of the input fields $i_c$ ($c \in \{1, 2, 3, 4\}$) were also randomly generated with a uniform (U) distribution of U[0, 1] and U[0, 2π), respectively. The ground truth (target) fields $o_c$ ($c \in \{1, 2, 3, 4\}$) were generated by calculating $o_c = A_c i_c$. For each $A_c$ ($c \in \{1, 2, 3, 4\}$) a total of 70,000 input/output complex fields were generated to form a dataset, divided into three parts: training, validation, and testing, each containing 55,000, 5,000, and 10,000 complex-valued field pairs, respectively.

Training loss function. For training of the diffractive networks, the mean-squared-error (MSE) loss function was used, which is defined as:

$$\mathcal{L}_{MSE,c} = E\left[\frac{1}{N_o}\sum_{n=1}^{N_o}|\tilde{o}_c[n] - \tilde{o}'_c[n]|^2\right] = E\left[\frac{1}{N_o}\sum_{n=1}^{N_o}|\sigma_c o_c[n] - \sigma'_c o'_c[n]|^2\right], \tag{7}$$

where E[•] denotes the average across the current batch, c stands for the $c^{th}$ polarization channel that is being accessed, and [n] indexes the $n^{th}$ element of the vector $\sigma_c$ and $$\sigma'_c$$

are the coefficients used to normalize the energy of the ground truth (target) field $\sigma_c$ and the diffractive-network output field $$\sigma'_c,$$

respectively, which are given by:

$$\sigma_c = \frac{1}{\sqrt{\sum_{n=1}^{N_o}|o_c[n]|^2}}, \tag{8}$$

$$\sigma'_c = \frac{\sum_{n=1}^{N_o}\sigma_c o_c[n] o'^*_c[n]}{\sum_{n=1}^{N_o}|o'_c[n]|^2}. \tag{9}$$

During the training of the diffractive networks using the SeqPA mode, each polarization channel of the diffractive network is accessed and evaluated cyclically based on the order of the channel number. For instance, for the 2-channel polarization multiplexed design illustrated in FIG. 1B, left, the access sequence during the training is set to be {①, ②, ①, ②, . . . }; for the 4-channel polarization multiplexed design illustrated in FIG. 6, the access sequence is {①, ②, ③, ④, ①, ②, ③, ④, . . . }; . During the access of a certain polarization channel, the diffractive network is fed with one batch of the training input/output complex fields corresponding to the transformation matrix assigned to this channel, and then trained based on the average loss across this batch. Thus, the loss function for training the diffractive designs through the $c^{th}$ polarization channel using the SeqPA mode, $\mathcal{L}_{Seq,c}$, can be simply written as:

$$\mathcal{L}_{Seq,c} = \mathcal{L}_{MSE,c}. \tag{10}$$

During the training of the diffractive networks using the SimPA mode, as illustrated in FIG. 1B, right, all the polarization channels of the diffractive network are accessed simultaneously, and the training data are fed into the channels at the same time. For this SimPA mode, the diffractive network is trained based on the loss averaged across the different polarization channels and complex-valued fields in the current batch, where the loss function $\mathcal{L}_{Sim}$ can be written as:

$$\mathcal{L}_{Sim} = \frac{1}{N_p}\sum_{c=1}^{N_p}\mathcal{L}_{MSE,c} \tag{11}$$

Performance metrics used for the quantification of all-optical transformation errors. To quantitatively evaluate the transformation results of the polarization-multiplexed diffractive networks, four performance metrics were calculated per polarization channel of the diffractive designs using the testing data set: (1) the normalized transformation mean-squared error ($MSE_{Transformation}$), (2) the cosine similarity (CosSim) between the all-optical transforms and the target transforms, (3) the normalized mean-squared error between the diffractive network output fields and their ground truth ($MSE_{Output}$), and (4) the output diffraction efficiency (η). The transformation error for the $c^{th}$ polarization channel of the diffractive network, $MSE_{Transformation,c}$, is defined as:

$$MSE_{Transformation,c} = \frac{1}{N_i N_o}\sum_{n=1}^{N_i N_o}|a_c[n] - m_c a'_c[n]|^2 = \frac{1}{N_i N_o}\sum_{n=1}^{N_i N_o}|a_c[n] - \tilde{a}'_c[n]|^2, \tag{12}$$

where $\alpha_c$ is the vectorized version of the ground truth transformation matrix assigned to the $c^{th}$ polarization channel $A_c$, i.e., $\alpha_c = \mathrm{vec}(A_c)$.

$$a'_c$$

are the vectorized version of $$A'_c,$$

which is the all-optical transformation matrix computed using the optimized diffractive transmission coefficients, $m_c$ is a scalar normalization coefficient used to eliminate the effect of diffraction-efficiency related scaling mismatch between $A_c$ and $$A'_c,$$

i.e., $$m_c = \frac{\sum_{n=1}^{N_i N_o} a_c[n] a_c'^*[n]}{\sum_{n=1}^{N_i N_o} |a_c'[n]|^2}. \tag{13}$$

The cosine similarity between the all-optical transform and their target transform for the $c^{th}$ polarization channel, $\text{CosSim}_c$, is defined as:

$$\text{Cos}Sim_c = \frac{|a_c^H \hat{a}_c'|}{\sqrt{\sum_{n=1}^{N_i N_o} |a_c[n]|^2} \sqrt{\sum_{n=1}^{N_i N_o} |\hat{a}_c'[n]|^2}}. \tag{14}$$

The normalized mean-squared error between the diffractive network outputs and their ground truth for the $c^{th}$ polarization channel, $\text{MSE}_{Output,c}$, is defined using the same formula as in Eq. 7 (the loss function used during the training process), except for that E[•] is calculated across the entire testing set.

The mean diffraction efficiency $\eta_c$ for the $c^{th}$ polarization channel of the diffractive system is defined as:

$$\eta_c = E\left[\frac{\sum_{n=1}^{N_o} |o_c'[n]|^2}{\sum_{n=1}^{N_i} |i_c[n]|^2}\right]. \tag{15}$$

Training-related details. All the polarization-encoded diffractive networks discussed herein were simulated and trained using Python (v3.8.11) and TensorFlow (v2.6.0, Google Inc.). The Adam optimizer was selected for training all the models, and its parameters were taken as the default values in TensorFlow and kept identical in each model. The batch size and learning rate were set as 8 and 0.001, respectively. The training of the diffractive network models using the SimPA mode was performed with 50 epochs. For training the diffractive models using the SeqPA mode, the 2-channel and 4-channel polarization multiplexed designs were trained for 100 and 200 epochs, respectively, so that equivalently 50 epochs are dedicated for training each polarization channel of these designs. The best models were selected based on the MSE loss calculated on the validation data set. For the training of the diffractive models, a desktop computer with a GeForce GTX 1080Ti graphical processing unit (GPU, NVidia Inc.) and Intel® Core™ i7-8700 central processing unit (CPU, Intel Inc.) and 64 GB of RAM was used, running Windows 10 operating system (Microsoft Inc.). The typical time to train a diffractive network model using the SeqPA mode with 2 and 4 polarization channels is ~7 and ~14 hours, respectively. The training time for a diffractive model using the SimPA mode with 2 polarization channels is ~4 hours.

It should be appreciated that various modifications and alternative embodiments of the polarization-encoded diffractive network 10 are contemplated. For example, the polarization-encoded diffractive network 10 may include substrate layers 12 that both transmit and reflect light or radiation. In addition, the polarizer arrays 24 may be integrated on one or more substrate layers 12. The polarizers 18, in some embodiments, may be omitted but this may increase crosstalk and negatively impact the output vectorized optical field 16.

Supplementary Note 1: Mathematical analysis of different polarization encoding schemes. Here different polarization encoding schemes that are used in the main text are analyzed. The optical fields are assumed to be fully polarized.

(1) For the 2-channel polarization multiplexed diffractive system that uses x or y polarization at both its input and output fields-of-view (FOVs), one can describe the transformation relationship between the inputs $i_x$, $i_y$ and the outputs $o_x$, $o_y$ using:

$$\begin{bmatrix} o_x \\ o_y \end{bmatrix} = \begin{bmatrix} A_{x-x} & A_{y-x} \\ A_{x-y} & A_{y-y} \end{bmatrix} \begin{bmatrix} i_x \\ i_y \end{bmatrix}, \tag{S16}$$

where $A_{x-x}$, $A_{y-x}$, $A_{x-y}$ $A_{y-y}$ are the desired/target transformation matrices represented by the polarization multiplexed diffractive networks.

When a polarization multiplexed diffractive network is operated using the SeqPA mode, we sequentially and separately force $t_x=0$ and $t_y=0$ and read out the corresponding $o_x$ and $o_y$, which can be written as:

$$\text{when } i_y = 0, \begin{cases} o_x = A_{x-x} i_x, & (\text{used as ①}) \\ o_y = A_{x-y} i_x, & (\text{not used in } SeqPA) \end{cases}, \tag{S17}$$

$$\text{when } i_x = 0, \begin{cases} o_x = A_{y-x} i_y, & (\text{not used in } SeqPA) \\ o_y = A_{y-y} i_y, & (\text{used as ②}) \end{cases}. \tag{S18}$$

So by training the system to approximate $o_x=A_{x-x}i_x \rightarrow A_i i_x$ and $o_y=A_{y-y}i_y \rightarrow A_2 i_y$, the diffractive network model converges to satisfy $$A_1' = A_{x-x} \rightarrow A_1 \text{ and } A_2' = A_{y-y} \rightarrow A_2.$$

When a polarization multiplexed diffractive system is operated using the SimPA mode, where both inputs $i_x$ and $i_y$ are fed into the diffractive networks simultaneously, the system is trained to satisfy $$o_x = A_{x-x} i_x + A_{y-x} i_y \rightarrow A_1 i_x, \tag{S19}$$

$$o_y = A_{x-y} i_x + A_{y-y} i_y \rightarrow A_2 i_y, \tag{S20}$$

so that the system converges to approximate $$A_1' = A_{x-x} \rightarrow A_1, A_2' = A_{y-y} \rightarrow A_2,$$

and also $A_{y-x}$, $A_{x-y} \rightarrow 0$ (zero cross talk). Therefore, after the training, the transformations performed by the diffractive systems using the SimPA mode can be represented using the following formula:

$$\begin{bmatrix} o_x \\ o_y \end{bmatrix} \approx \begin{bmatrix} A_1' & 0 \\ 0 & A_2' \end{bmatrix} \begin{bmatrix} i_x \\ i_y \end{bmatrix} \Leftrightarrow \begin{cases} o_x \approx A_1' i_x, & (\text{used as ①}) \\ o_y \approx A_2' i_y, & (\text{used as ②}) \end{cases}. \tag{S21}$$

Compared to the SeqPA mode, the SimPA mode presents more constraints to the system (i.e., penalizing $A_{y-x}$ $A_{x-y}$ to approach 0). Equation (S6) only holds for the SimPA mode of operation since $A_{y-x}$ and $A_{x-y}$ are not used in sequential polarization access. i.e., are ignored in the SeqPA mode (without any penalties).

(2) For the 4-channel polarization multiplexed diffractive network, the transformation relationship between the inputs $i_x$, $i_y$ and the outputs $o_\alpha$, $o_\beta$ can be described using the following equation:

$$\begin{bmatrix} o_\alpha \\ o_\beta \end{bmatrix} = \begin{bmatrix} A_{x-\alpha} & A_{y-\alpha} \\ A_{x-\beta} & A_{y-\beta} \end{bmatrix} \begin{bmatrix} i_x \\ i_y \end{bmatrix}. \tag{S22}$$

One can sequentially and separately force $i_x=0$ or $i_y=0$ and read out the corresponding $o_\alpha$ and $o_\beta$, which can be written as:

$$\text{when } i_y = 0, \begin{cases} o_\alpha = A_{x-\alpha} i_x, & (\text{used as ①}) \\ o_\beta = A_{x-\beta} i_x, & (\text{used as ③}) \end{cases}, \tag{S23}$$

$$\text{when } i_x = 0, \begin{cases} o_\alpha = A_{y-\alpha} i_y, & (\text{used as ④}) \\ o_\beta = A_{y-\beta} i_y, & (\text{used as ②}) \end{cases}. \tag{S24}$$

By training the system to approximate $o_\alpha=A_{x-\alpha}i_x \rightarrow A_1 i_x$, $o_\beta=A_{y-\beta}i_y \rightarrow A_2 i_y$, $o_\beta=A_{x-\beta}i_x \rightarrow A_3 i_x$ and $o_\alpha=A_{y-\alpha}i_y \rightarrow A_4 i_y$, the diffractive network model converges to satisfy $$A_1' = A_{x-\alpha} \rightarrow A_1,\ A_2' = A_{y-\beta} \rightarrow A_2,\ A_3' = A_{x-\beta} \rightarrow A_3 \text{ and } A_4' = A_{y-\alpha} \rightarrow A_4.$$

To directly access the four diffractive linear transformation matrices $$(\text{i.e., } A_1', A_2', A_3' \text{ and } A_4'),$$

we set either $i_x$ or $i_y$ as 0 and read the output fields of $o_\alpha$ and $o_\beta$ in each case (based on Eqs. (S8-S9)).

(3) The input polarization channels of the diffractive network can also use left and right-hand circular polarization states (LHCP and RHCP):

$$\begin{bmatrix} o_x \\ o_y \end{bmatrix} = \begin{bmatrix} A_{LHCP-x} & A_{LHCP-y} \\ A_{RHCP-x} & A_{RHCP-y} \end{bmatrix} \begin{bmatrix} i_{LHCP} \\ i_{RHCP} \end{bmatrix} = \tag{S25}$$

$$\begin{bmatrix} A_{LHCP-x} & A_{LHCP-y} \\ A_{RHCP-x} & A_{RHCP-y} \end{bmatrix} \begin{bmatrix} 1 & e^{j\pi/2} \\ e^{-j\pi/2} & 1 \end{bmatrix} \begin{bmatrix} i_x \\ i_y \end{bmatrix} =$$

$$\begin{bmatrix} A_{LHCP-x} - jA_{LHCP-y} & jA_{LHCP-x} + A_{LHCP-y} \\ A_{RHCP-x} - jA_{RHCP-y} & jA_{RHCP-x} + A_{RHCP-y} \end{bmatrix} \begin{bmatrix} i_x \\ i_y \end{bmatrix}.$$

Based on Equation (S10), if one uses LHCP and RHCP as the input polarization channels of the system, the four linear transformation matrices that are encoded through the same diffractive network can be represented by their counterparts measured using the x and y polarization channels. Also see FIGS. 22A-22D, which reveals that circular input polarization-multiplexed diffractive processors can successfully approximate the target, complex-valued linear transformations, when N approaches $N_pN_iN_o=4N_iN_o=4N_iN_o=16.4$ k, arriving at the same conclusion for linear input polarization states. Since this type of Jones unitary transformations can be applied between any combinations of orthogonal polarization states, it can be further inferred that a polarization multiplexed diffractive processor with $N_p=4$ can be designed by using input-output combinations of 2 orthogonal input polarization states (e.g., linear, circular or elliptical) and 2 orthogonal output polarization states (e.g., linear, circular or elliptical), where each input-output polarization combination all-optically performs one of the target complex-valued linear transformations ($A_1$, $A_2$, $A_3$, $A_4$).

(4) Here, the case of $N_p>4$ under the SeqPA mode of operation is explored. Suppose that there exists a new linear transformation $A_{\delta-\gamma}$ independent of the other four target linear transformations ($A_1$, $A_2$, $A_3$, $A_4$). $A_{\delta-\gamma}$ operates between $i_\delta$ and $o_\gamma$ at the input and output FOVs of the polarization multiplexed diffractive system (i.e., $i_\delta$ and $o_\gamma$ are defined by the optical fields linearly polarized at the angles of $i_\delta$ and $o_\gamma$, respectively, from the x-axis):

$$o_\gamma \equiv A_{\delta-\gamma} i_\delta. \tag{S26}$$

Since $i_\delta$ and $o_\gamma$ share the same input and output FOVs as ($i_x$, $i_y$) and ($o_x$, $o_y$), we can decompose them into x and y polarization states:

$$o_\gamma = \cos\gamma o_x + \sin\gamma o_y, \tag{S27}$$

$$i_\delta = \cos\delta i_x + \sin\delta i_y \tag{S28}$$

$$i_y = \tan\delta i_x$$

Based on these we can write:

$$o_\gamma = A_{\delta-\gamma} i_\delta = \tag{S29}$$

$$\cos\delta A_{\delta-\gamma} i_x + \sin\delta A_{\delta-\gamma} i_y = (\cos\delta A_{\delta-\gamma} + \tan\delta \sin\delta A_{\delta-\gamma}) i_x = A_{\delta-\gamma} i_x / \cos\delta$$

$$o_\gamma = \cos\gamma (A_{x-x} i_x + A_{y-x} i_y) + \sin\gamma (A_{x-y} i_x + A_{y-y} i_y) = \tag{S30}$$

$$\cos\gamma A_{x-x} + \sin\gamma A_{x-y}) i_x + (\cos\gamma A_{y-x} + \sin\gamma A_{y-y}) i_y =$$

$$(\cos\gamma A_{x-x} + \sin\gamma A_{x-y} + \tan\delta(\cos\gamma A_{y-x} + \sin\gamma A_{y-y})) i_x$$

Using Eqs. (S14) and (S15), we can write:

$$A_{\delta-\gamma} = \cos\delta(\cos\gamma A_{x-x} + \sin\gamma A_{x-y}) + \sin\delta(\cos\gamma A_{y-x} + \sin\gamma A_{y-y}) \tag{S31}$$

Based on Eq. (S16), $A_{\delta-\gamma}$ cannot represent an independent linear transformation, and it linearly depends on $A_{x-y}$, $A_{y-x}$, $A_{x-y}$ and $A_{y-y}$ of the polarization multiplexed diffractive network. Stated differently, an additional transformation matrix $A_\alpha=A_{\delta-\gamma}$ that can be assigned to a new combination of input-output polarization states of the diffractive network can be written as a linear combination of $A_1$, $A_2$, $A_3$ and $A_4$. In this case, depending on the target linear transformation set ($A_1$, $A_2$, $A_3$ and $A_4$, $A_\alpha$) and the acceptable error threshold for each transformation, a diffractive design with $N_p>4$ can be optimized using polarization multiplexing to provide approximate solutions to the target linear transformations. However, the approximation error and the computational accuracy for this case of $N_p>4$ will depend on the Euclidean distances among the target complex-valued transformation matrices, and for certain sets of target linear transformations, the trained diffractive network might fail to achieve an acceptable error threshold in its approximation of $A_1$, $A_2$, $A_3$, $A_4$ and $A_\alpha$.

Figure 23A:
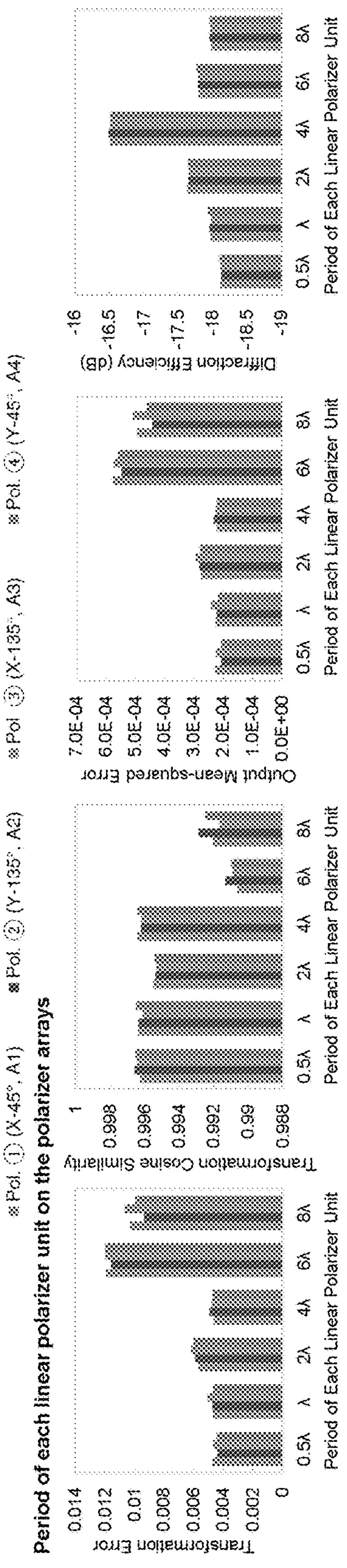
FIGS. 23A-23C illustrate the analysis of the impact of the polarizer array parameters on the computational performance of polarization multiplexed diffractive networks.
Figure 23B:
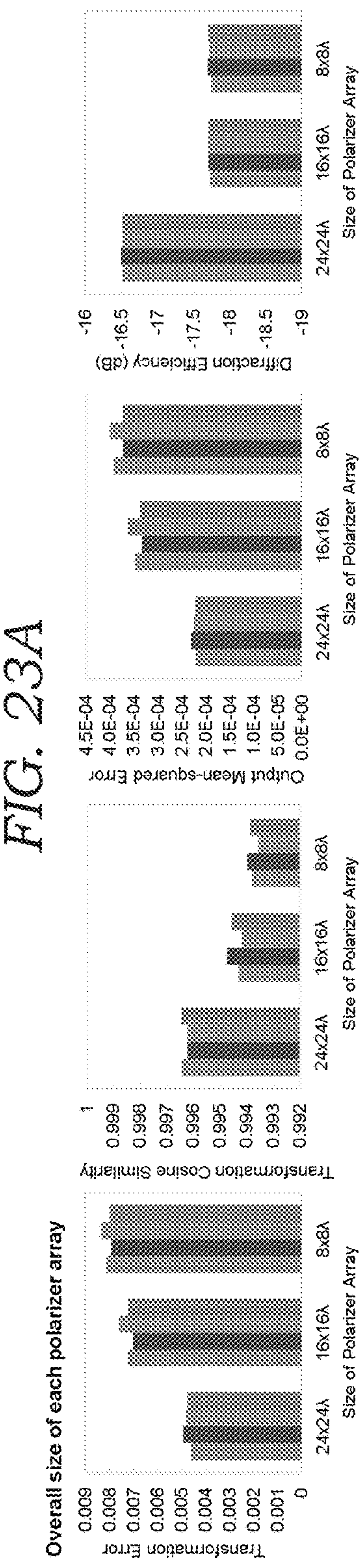
Figure 23C:
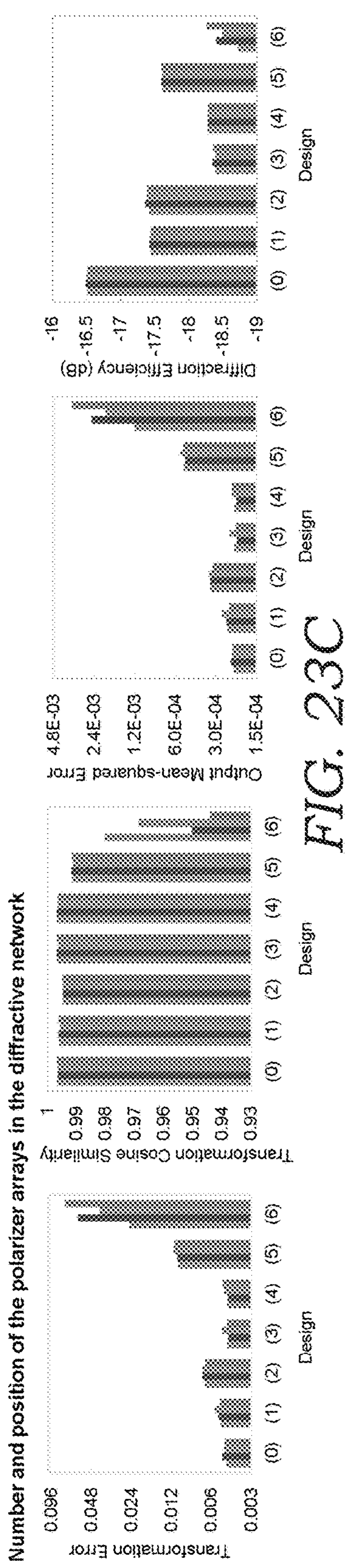
Figure 24A:
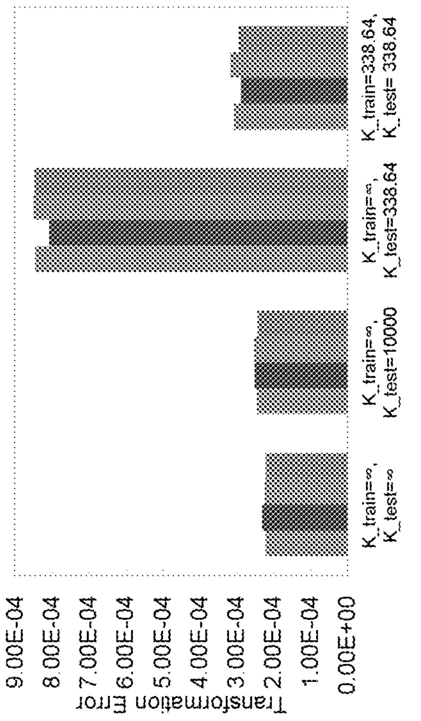
FIGS. 24A-24D illustrates the polarization extinction ratio (PER)-related analysis of polarization multiplexed diffractive networks. Note that for FIGS. 24A-24C each histogram has data presented for the different polarizer arrays (①, ②, ③) and ④) arranged from left to right.
Figure 24B:
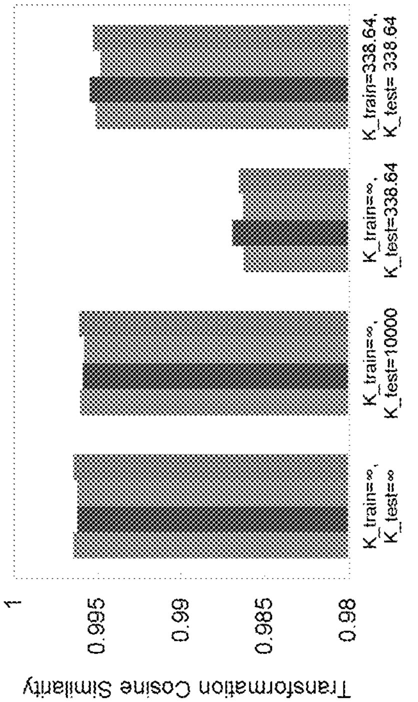
Figure 24C:
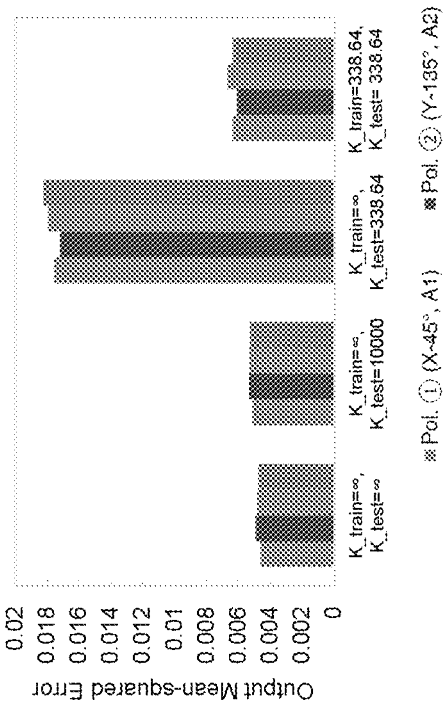
Figure 24D:
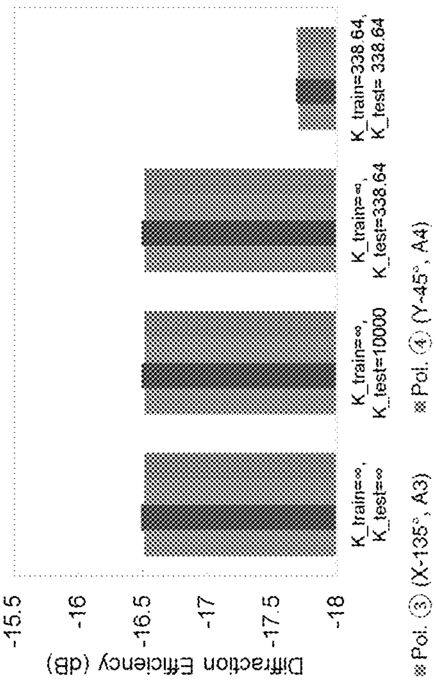

Supplementary Note 2. Here, the impact of some physical parameters of the polarizer arrays on the computational performance of polarization multiplexed diffractive networks is analyzed. As the testbed, the 4-channel polarization multiplexed system described herein was used with $N=N_pN_iN_o=16.3$ k and the same four target linear transforms (i.e., $A_1$, $A_2$, $A_3$ and $A_4$), i.e., $N_p=4$. As shown in FIGS. 23A-23C, three different comparisons were explored to perform this analysis by varying (A) the period of each linear polarizer unit on the polarizer array, (B) the overall size of each polarizer array, and (C) the number and position of these polarizer arrays within the diffractive network. All the parameter tuning used here is performed based on the $N_p=4$ system that are reported in the Methods section.

Since the number and position of the polarizer arrays within a diffractive network can be arranged in various combinations, the following seven designs were selected for comparison, each of which was assigned a unique notation/number in FIG. 23C:

"(0)" refers to the diffractive model used in the main text ($N_p=4$), which has 2 cm polarizer arrays placed after the 3rd and 5th diffractive layers;

"(1)" has 2 polarizer arrays placed after the 4th and 5th diffractive layer;

"(2)" has 2 polarizer arrays placed after the 3rd and 6th diffractive layers;

"(3)" has 4 polarizer arrays placed after the 3rd to 6th diffractive layers;

"(4)" has 6 polarizer arrays placed after the 2nd to 7th diffractive layers;

"(5)" has 8 polarizer arrays placed after all the diffractive layers;

"(6)" has only one polarizer array placed after the 5th diffractive layer.

Based on this comparative analysis reported in FIGS. 23A-23C, the observations can be summarized as follows:

1. A better all-optical approximation accuracy can be achieved when the period of each linear polarization unit on the polarizer array is ≤4λ, and a period of ~4λ empirically appears as an optimal choice, also providing an improved output diffraction efficiency;
2. The transformation accuracy and the diffraction efficiency of the system can be optimized by using polarizer arrays with a sufficiently large size, i.e., at least matching the size/width of the neighboring trainable diffractive layers;
3. Using two polarizer arrays and placing them apart with an axial distance of ~8λ within the diffractive volume can provide improved results for the all-optical transformation accuracy and the diffraction efficiency of $N_p=4$ designs;
4. Using too many (e.g., >6) or too few (e.g., 1) polarizer arrays will considerably deteriorate the computational accuracy of the diffractive processor for $N_p=4$.

Supplementary Note 3. Here the 4-channel polarization multiplexed diffractive processor (depicted in FIG. 6A-6B) was used to analyze how the modeling of the PER (κ) of the polarizer arrays would affect the computational performance of the diffractive system. Two different PERs were used, i.e., $\kappa=10^5$ and $\kappa=338.64$, where these PER values reflect (1) the typical PER of commercial linear polarizers and (2) the PER of a microscopic polarizer filter array used in polarization-based CMOS image sensors, respectively. One can model the linear polarizer elements on each polarizer array/seed with a finite PER in the following form:

$$J_{linear}(x,y,z)=\begin{bmatrix}\cos^2\theta(x,y,z)+\kappa^{1/2}\sin^2\theta(x,y,z) & (1-\kappa^{-1/2})\cos\theta(x,y,z)\sin\theta(x,y,z)\\ (1-\kappa^{-1/2})\sin\theta(x,y,z)\cos\theta(x,y,z) & \sin^2\theta(x,y,z)+\kappa^{-1/2}\cos^2\theta(x,y,z)\end{bmatrix}. \quad \text{(S32}$$

Using Eq. (S17) as part of the optical forward model, the computational performance of the polarization multiplexed diffractive processors ($N_p=4$) as a function of different PER values is reported in FIGS. 24A-24D. It can be seen that even for a small PER value of 338.64, by appropriately training the polarization multiplexed diffractive network using $\kappa_{train}=338.64$, the all-optical transformation accuracy of the diffractive network can approximately match the ideal case of $\kappa_{train}=\infty$, $\kappa_{test}=\infty$ (FIGS. 24A-24D). Furthermore, the results also reveal that a relatively large PER of $\kappa=10^5$ has a negligible impact on the linear transformation performance of the diffractive network compared to the ideal case of ($\kappa_{train}=\infty$, $\kappa_{test}=\infty$).

(2) One can also consider each polarization multiplexed diffractive processor as a monolithic polarization optical element and quantify the overall PER of the diffractive network after its training. It should be noted that for the SeqPA mode of operation, PER is not a meaningful figure-of-merit for a polarization multiplexed diffractive network since only one orthogonal polarization state is read/measured at a given time due to the sequential access of each target transformation through the diffractive network. In other words, the SeqPA mode of operation does not penalize the leakage of power into an orthogonal polarization state at the output field-of-view as it does not impact the accuracy of each all-optical transformation that is sequentially performed. Therefore, this PER analysis for the entire diffractive network treated as a single polarization optical element was only applied to the SimPA-based 2-channel polarization multiplexed diffractive design, which resulted in an overall PER of 51726.596 at the output field-of-view of the diffractive network.

Such a high PER is expected since the SimPA mode is designed to simultaneously perform two different linear transformations using two orthogonal polarization states, and therefore undesired polarization cross-talk at the output field-of-view was penalized during the training phase, successfully leading to the observed high PER value.

While embodiments of the present invention have been shown and described, various modifications may be made without departing from the scope of the present invention. The invention, therefore, should not be limited, except to the following claims, and their equivalents.

What is claimed is:

1. A polarization-encoded diffractive network comprising:

one or more optically transmissive and/or reflective substrate layer(s) arranged in an optical path having one or more polarizer arrays interposed between the one or more optically transmissive and/or reflective substrate layer(s) along the optical path, each of the optically transmissive and/or reflective substrate layer(s) comprising a plurality of physical features formed on or within the one or more optically transmissive or reflective substrate layer(s) and having different transmission and/or reflection properties as a function of the lateral coordinates across each substrate layer, wherein the one or more optically transmissive and/or reflective substrate layer(s) and the one or more polarizer arrays collectively define or approximate a plurality of distinct optical transformations between a vectorized input optical field input to the polarization-encoded diffractive network and a vectorized output optical field output from the polarization-encoded diffractive network; and wherein the one or more optically transmissive and/or reflective substrate layer(s) are designed during a training phase with the one or more polarizer arrays to define or optimize the plurality of physical features formed on or within the one or more optically transmissive or reflective substrate layer(s) to perform or approximate the plurality of distinct optical transformations between the input and the output.

2. The polarization-encoded diffractive network of claim 1, wherein the one or more polarizer array(s) include linear polarizers at a plurality of orientations.

3. The polarization-encoded diffractive network of claim 1, wherein the one or more polarizer array(s) include circular and/or elliptical polarizers at a plurality of orientations.

4. The polarization-encoded diffractive network of claim 1, wherein the one or more distinct optical transformations include at least one of: object classification, object segmentation, object imaging, object detection, object image filtering, object image compression, object image encryption, and an analog logical operation.

5. The polarization-encoded diffractive network of claim 1, wherein the plurality of distinct optical transformations are implemented or approximated at ultra-violet or visible or infrared or terahertz or microwave parts of the electromagnetic spectrum.

6. The polarization-encoded diffractive network of claim 1, wherein the vectorized input optical field comprises narrowband or broadband radiation.

7. The polarization-encoded diffractive network of claim 1, wherein the one or more polarizer arrays have individual polarizer elements with orientations and locations that are fixed or controllable/programmable/reconfigurable.

8. The polarization-encoded diffractive network of claim 1, wherein the one or more polarizer arrays in the polarization-encoded diffractive network are physically integrated on or within the one or more optically transmissive and/or reflective substrate layer(s).

9. The polarization-encoded diffractive network of claim 1, further comprising one or more image sensors or detector arrays configured to receive the vectorized output optical field from the polarization-encoded diffractive network.

10. The polarization-encoded diffractive network of claim 1, further comprising respective polarizers located along the optical path before and after the one or more optically transmissive and/or reflective substrate layer(s).

11. The polarization-encoded diffractive network of claim 1, wherein the one or more polarizer arrays are located on or adjacent to a surface of the one or more optically transmissive and/or reflective substrate layer(s).

12. The polarization-encoded diffractive network of claim 1, wherein the plurality of distinct optical transformations are implemented or approximated sequentially.

13. The polarization-encoded diffractive network of claim 1, wherein the plurality of distinct optical transformations are implemented or approximated simultaneously.

14. The polarization-encoded diffractive network of claim 1, wherein the plurality of distinct optical transformations comprise complex-valued transformations of the vectorized input optical field.

15. A method of performing a plurality of optical transformations of a vectorized input optical field using a polarization-encoded diffractive network comprising:

providing a polarization-encoded diffractive network comprising one or more optically transmissive and/or reflective substrate layer(s) arranged in an optical path having one or more polarizer arrays interposed between the one or more optically transmissive and/or reflective substrate layer(s) along the optical path, each of the optically transmissive and/or reflective substrate layer (s) comprising a plurality of physical features formed on or within the one or more optically transmissive or reflective substrate layer(s) and having different transmission and/or reflection properties as a function of the lateral coordinates across each substrate layer, wherein the one or more optically transmissive and/or reflective substrate layer(s) and the one or more polarizer arrays collectively define or approximate a plurality of distinct optical transformations between the vectorized input optical field input to the polarization-encoded diffractive network and a vectorized output optical field output from the polarization-encoded diffractive network, wherein the one or more optically transmissive and/or reflective substrate layer(s) are designed during a training phase with the one or more polarizer arrays to define the plurality of physical features formed on or within the one or more optically transmissive or reflective substrate layer(s) to perform or approximate the plurality of distinct optical transformations;

inputting the vectorized input optical field to the polarization-encoded diffractive network; and capturing the vectorized output optical field from the polarization-encoded diffractive network with one or more image sensors or detector arrays.

16. The method of claim 15, wherein the one or more polarizer array(s) include linear polarizers at a plurality of orientations.

17. The method of claim 15, wherein the one or more polarizer array(s) include circular and/or elliptical polarizers at a plurality of orientations.

18. The method of claim 15, wherein the plurality of distinct optical transformations include at least one of: object classification, object segmentation, object imaging, object detection, object image filtering, object image compression, object image encryption, and an analog logical operation.

19. The method of claim 15, wherein the plurality of distinct optical transformations are implemented or approximated at ultra-violet or visible or infrared or terahertz or microwave parts of the electromagnetic spectrum.

20. The method of claim 15, wherein the vectorized input optical field comprises narrowband or broadband radiation.

21. The method of claim 15, wherein the one or more polarizer arrays have individual polarizer elements with orientations and locations that are fixed or controllable/programmable/reconfigurable.

22. The method of claim 15, wherein the one or more polarizer arrays in the polarization-encoded diffractive network are physically integrated on or within the one or more optically transmissive and/or reflective substrate layer(s).

23. The method of claim 15, wherein the vectorized input optical field comprises a two-dimensional complex data field.

24. The method of claim 15, wherein the vectorized input optical field and the vectorized output optical field each comprises an array of pixel values.

25. The method of claim 15, further the vectorized input optical field and the vectorized output optical field are passed through respective polarizers before and after the one or more optically transmissive and/or reflective substrate layer(s).

26. The method of claim 15, wherein the plurality of distinct optical transformations comprise complex-valued optical transformations of the vectorized input optical field.

27. The method of claim 15, wherein the vectorized input optical field comprises a first optical field having a first polarization and a second optical field having a second polarization, wherein the first optical field and the second optical field are simultaneously input to the to the polarization-encoded diffractive network.

28. The method of claim 27, wherein the first optical field having a first polarization and a second optical field having a second polarization are combined to generate the vectorized input optical field.

29. The method of claim 27, wherein the vectorized output optical field from the polarization-encoded diffractive network is split into a first path and a second path, wherein the first path contains a polarizer with the first polarization and a first image sensor and wherein the second path contains a polarizer with the second polarization and a second image sensor.

* * * * *